United States Patent
Yamaguchi et al.

(10) Patent No.: US 6,492,035 B1
(45) Date of Patent: Dec. 10, 2002

(54) MAGNETO-OPTICAL RECORDING MEDIUM WITH INTERMEDIATE LAYER HAVING A CONTROLLED SATURATION MAGNETIZATION

(75) Inventors: Atsushi Yamaguchi, Ogaki (JP); Naoyuki Takagi, Fuwa-gun (JP); Kenichiro Mitani, Anpachi-gun (JP); Hitoshi Noguchi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/530,497

(22) PCT Filed: Aug. 18, 1999

(86) PCT No.: PCT/JP99/04444

§ 371 (c)(1),
(2), (4) Date: May 1, 2000

(87) PCT Pub. No.: WO00/13177

PCT Pub. Date: Mar. 9, 2000

(30) Foreign Application Priority Data

Aug. 31, 1998 (JP) .............................. 10-245637
Mar. 12, 1999 (JP) .............................. 11-066876
Mar. 16, 1999 (JP) .............................. 11-070424

(51) Int. Cl.$^7$ ............................ G11B 11/105
(52) U.S. Cl. ................ 428/611; 428/668; 428/212; 428/694 RE; 428/694 MM; 428/694 GR; 369/13.38
(58) Field of Search .................. 428/611, 900, 428/636, 637, 655, 668, 682, 694 RE, 694 MM, 694 EC, 694 GR; 369/13.38

(56) References Cited

U.S. PATENT DOCUMENTS

| 5,265,074 A | * | 11/1993 | Ohta et al. .................... 360/59 |
| 5,418,076 A | * | 5/1995 | Shiratori ............... 428/694 EC |
| 5,661,716 A | * | 8/1997 | Saito .......................... 369/100 |
| 5,814,418 A | * | 9/1998 | Nishikiori et al. ... 428/694 ML |
| 6,122,228 A | * | 9/2000 | Shimazaki et al. ......... 369/116 |
| 6,147,939 A | * | 11/2000 | Takahashi et al. ........... 369/13 |

FOREIGN PATENT DOCUMENTS

| EP | 0 604 065 | 6/1994 |
| EP | 0 657 880 | 6/1995 |
| EP | 0 923 073 | 6/1999 |
| JP | 6-180874 | 6/1994 |
| JP | 7-220312 | 8/1995 |
| JP | 8-241543 | 9/1996 |
| JP | 9-198731 | 7/1997 |
| JP | 10-21595 | 1/1998 |
| JP | 11-232714 | 8/1999 |

* cited by examiner

Primary Examiner—Stevan A. Resan
Assistant Examiner—Kevin M. Bernatz
(74) Attorney, Agent, or Firm—Armstrong, Westerman & Hattori, LLP

(57) ABSTRACT

A magneto-optical recording medium of magnetic domain enlarging/reproducing system including a recording layer and a reproducing layer, a gate layer selectively extracting each magnetic domain within the recording layer is formed on the recording layer, a magnetic field reinforcement layer reinforcing a leakage magnetic field reaching the reproducing layer is formed on the gate layer, and a blocking layer blocking an exchange coupling force from the magnetic field reinforcement layer to the reproducing layer is formed on the magnetic field reinforcement layer.

15 Claims, 20 Drawing Sheets

POSITION ALONG WITH THE IRRADIATED
LASER BEAM ON THE GATE/MAGNETIC
FIELD REINFORCEMENT LAYER

MAGNETO-OPTICAL RECORDING MEDIUM WITH INTERMEDIATE LAYER HAVING A CONTROLLED SATURATION MAGNETIZATION

BACKGROUND OF THE INVENTION

1. Field of the Invention

The present invention relates to a magneto-optical recording medium, and more particularly, to a magneto-optical recording medium of a magnetic domain enlarging/reproducing system in which a magnetic domain of a recording layer is copied to a reproducing layer and enlarged to reproduce a signal.

2. Description of the Related Art

A magneto-optical recording medium, which is noted as a rewritable and highly reliable recording medium having a large storeage capacity, has been put into practice as a computer memory or the like. Further, standardization of a magneto-optical recording medium having a storage capacity of 6.0 Gbytes is recently progressed and would be available for practical use. The signal reproduction from such a magneto-optical recording medium with high density is performed by MSR (Magnetically Induced Super Resolution) method, which copies a magnetic domain of a recording layer of the magneto-optical recording medium to a reproducing layer while forming a detecting window in the reproducing layer so as to detect only the copied magnetic domain and detecting the magnetic domain copied from the detecting window.

Further, in the signal reproduction from the magneto-optical recording medium, the technology of a magnetic domain enlarging/reproducing has been developed, which applies an alternating magnetic field and enlarges the magnetic domain copied from the recording layer to the reproducing layer by the alternating magnetic field to reproduce a signal, and a magneto-optical recording medium, which can record and/or reproduce a signal of 14 Gbyte on the disk of 12 cm in diameter by the technology, has also been proposed.

Such a magneto-optical recording medium of the magnetic domain enlarging/reproducing system generally includes a reproducing layer, a non-magnetic layer formed on the reproducing layer, and a recording layer formed on the non-magnetic layer. In the signal reproduction from the magneto-optical recording medium obtained by enlarging the magnetic domain, a laser beam is directed from the reproducing layer side, and an external magnetic field for enlarging and erasing of the magnetic domain is applied from the side of the recording layer, whereby the magnetic domain of the recording layer is copied to the reproducing layer and enlarged, by a magneto-static coupling via the non-magnetic layer. The magnetic domain copied to the reproducing layer and enlarged is detected by the laser beam directed from the side of the reproducing layer, whereby the signal in the recording layer is reproduced.

The above-described copy of the magnetic domain by the magneto-static coupling occurs in response to a leakage magnetic field from the recording layer and the reproducing layer. However, because of the random magnetic domain length of the recording layer, a problem arises in that the profile of the leakage magnetic field differs depending on the magnetic domain length. That is, for a short magnetic domain length, the intensity of the leakage magnetic field becomes maximum at the center of the magnetic field, whereas for a long magnetic field length, it considerably weakens at the center of the magnetic field. Thus, the long magnetic domain may not be copied while the short magnetic domain is reliably copied.

SUMMARY OF THE INVENTION

It is an object of the present invention to provide a magneto-optical recording medium in which a magnetic domain can be reliably copied from a recording layer to a reproducing layer independently of the magnetic domain length of the recording layer.

According to the present invention, the magneto-optical recording medium includes a reproducing layer, a blocking layer formed on the reproducing layer, a gate/magnetic field reinforcement layer formed on the blocking layer, and a recording layer formed on the gate/magnetic field reinforcement layer. The gate/magnetic field reinforcement layer selectively extracts each magnetic domain within the recording layer and reinforces a leakage magnetic field reaching there from to the reproducing layer to copy the extracted magnetic domain into the reproducing layer. The blocking layer blocks an exchange-coupling force from the gate/magnetic field reinforcement layer to the reproducing layer.

Preferably, the above-described gate/magnetic field reinforcement layer includes a gate layer and a magnetic field reinforcement layer. The gate layer selectively extracts each magnetic domain. The magnetic field reinforcement layer is formed between the blocking layer and the gate layer to reinforce the leakage magnetic field.

Alternatively, the above-described gate/magnetic field reinforcement layer has a saturation magnetization increasing from the side of the recording layer toward the side of the blocking layer at a reproducing temperature.

In the above-described magneto-optical recording medium, the magnetic domain in the recording layer is not selectively extracted depending on its length, so that the extracted magnetic domain can reliably be copied to the reproducing layer. Further, because the leakage magnetic field reaching the reproducing layer is reinforced, the extracted magnetic domain can more reliably be copied into the reproducing layer. The blocking layer is also provided so as to block the exchange-coupling force to the reproducing layer. As a result, the magnetic domain copied into the reproducing layer can smoothly be enlarged.

DETAILED DESCRIPTION OF THE PREFERRED EMBODIMENTS

Figure 1:
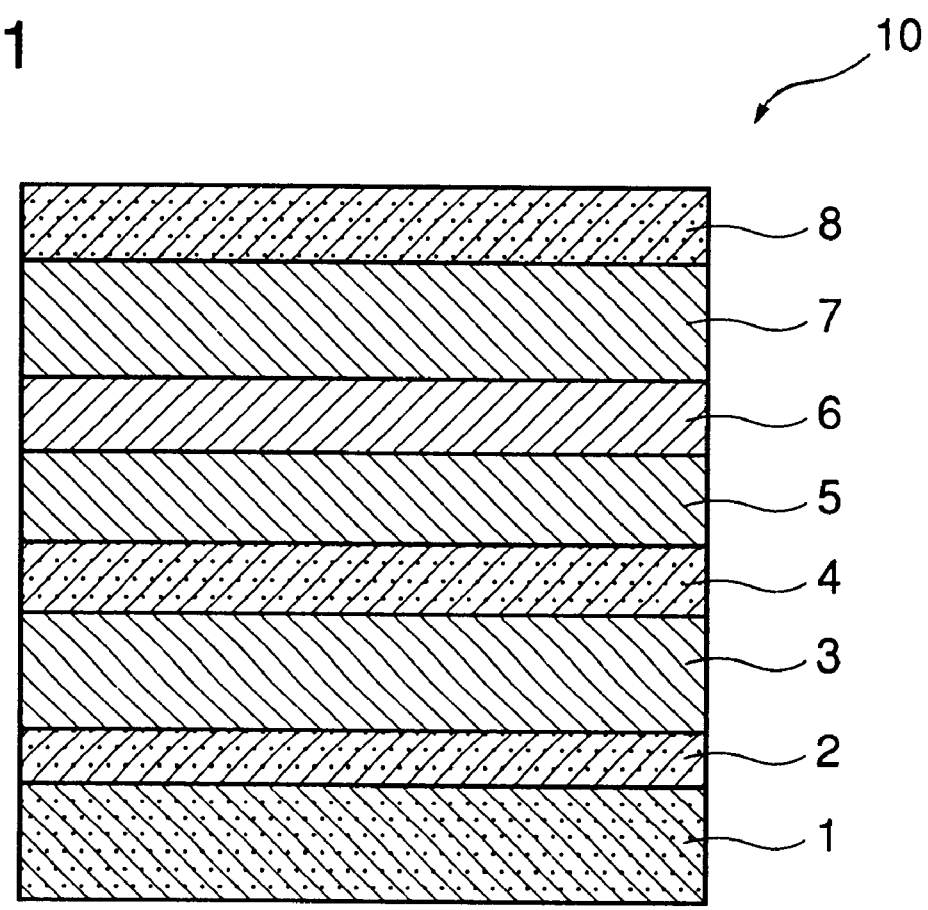
FIG. 1 is a sectional view illustrating a structure of the magneto-optical recording medium according to the first embodiment of the invention.

Embodiments of the present invention will be described in detail with reference to the drawings in the following. In the drawings, identical or similar parts are designated by the same reference characters and the descriptions thereof will not be repeated.

First Embodiment

A magneto-optical recording medium 10 according to the first embodiment of the present invention includes a transparent substrate 1, a buffer layer 2 formed on transparent substrate 1, a reproducing layer 3 formed on buffer layer 2, a blocking layer 4 formed on reproducing layer 3, a magnetic field reinforcement layer 5 formed on blocking layer 4, a gate layer 6 formed on magnetic field reinforcement layer 5, a recording layer 7 formed on gate layer 6, and a protective layer 8 formed on recording layer 7.

Transparent substrate 1 is made of polycarbonate, glass or the like. Buffer layer 2 is made of SiN. Reproducing layer 3 is made of GdFeCo containing 18–23 at. % of Gd. Blocking layer 4 is made of SiN. Magnetic field reinforcement layer 5 is made of GdFeCo containing 18–23 at. % of Gd. Gate layer 6 is made of GdFeCo containing 22–30 at. % of Gd. Recording layer 7 is made of TbFeCo. Protective layer 8 is made form SiN.

Buffer layer 2 has a thickness of 500–800 Å. Reproducing layer 3 has a thickness of 200–400 Å. Blocking layer 4 has a thickness of 200–300 Å. Magnetic field reinforcement layer 5 has a thickness of 600–1000 Å. Gate layer 6 has a thickness of 800–2000 Å. Recording layer 7 has a thickness of 500–2000 Å. Protective layer 8 has a thickness of 500–800 Å.

In this magneto-optical recording medium 10, a magnetic domain of recording layer 7 is copied to reproducing layer 3 via gate layer 6, magnetic field reinforcement layer 5 and blocking layer 4, and the copied magnetic domain is enlarged by the external magnetic field. As a result, the enlarged magnetic domain is detected by the laser beam entering from the side of transparent substrate 1, whereby a signal is reproduced.

In such a signal reproducing process, it is necessary to perform the copy from recording layer 7 to gate layer 6 by exchange coupling in order to reliably copy the magnetic domain of recording layer 7 into reproducing layer 3 independently of the magnetic domain length (the first condition).

Further, in order to facilitate the enlargement, by an external magnetic field, of the magnetic domain copied to reproducing layer 3, magneto-static coupling must be used to copy the magnetic domain from gate layer 6 to reproducing layer 3 keeping reproducing layer 3 away from the exchange-coupling force from the other magnetic layers (the second condition).

Moreover, a leakage magnetic field from gate layer 6 to reproducing layer 3 must be increased in order to perform the copy of the magnetic domain from gate layer to reproducing layer 3 by magneto-static coupling (the third condition).

To satisfy the first condition, gate layer 6 is formed in contact with recording layer 7. Blocking layer 4 is formed between gate layer 6 and reproducing layer 3 to satisfy the second condition. Further, magnetic field reinforcement layer 5 is formed between gate layer 6 and blocking layer 4 to satisfy the third condition.

Next, referring to FIGS. 2A through 2D, the signal reproducing process in magneto-optical recording medium 10 is described in detail.

Figure 2A:
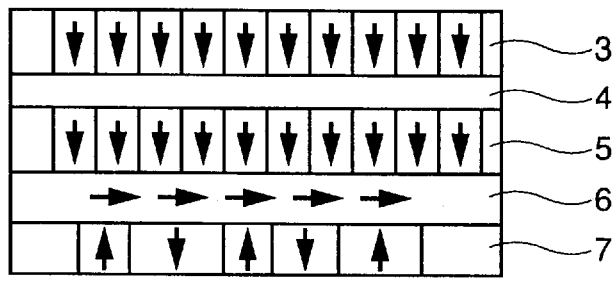
FIGS. 2A to 2D illustrate a process of reproducing a signal from a short magnetic domain within the magneto-optical recording medium shown in FIG. 1.

Before magneto-optical recording medium 10 is irradiated with a laser beam and the external magnetic field for the magnetic domain enlargement is applied thereto, gate layer 6 is an in-plane magnetization film and magnetic field reinforcement layer 5 and reproducing layer 3 are perpendicular magnetization films magnetized in one direction by an initialization magnetic field, as shown in FIG. 2A. Recording layer 7 is a perpendicular magnetization film magnetized in response to a recorded signal.

Figure 2B:
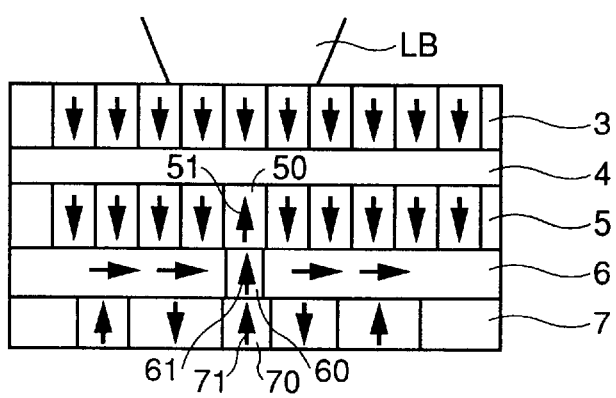
Figure 3:
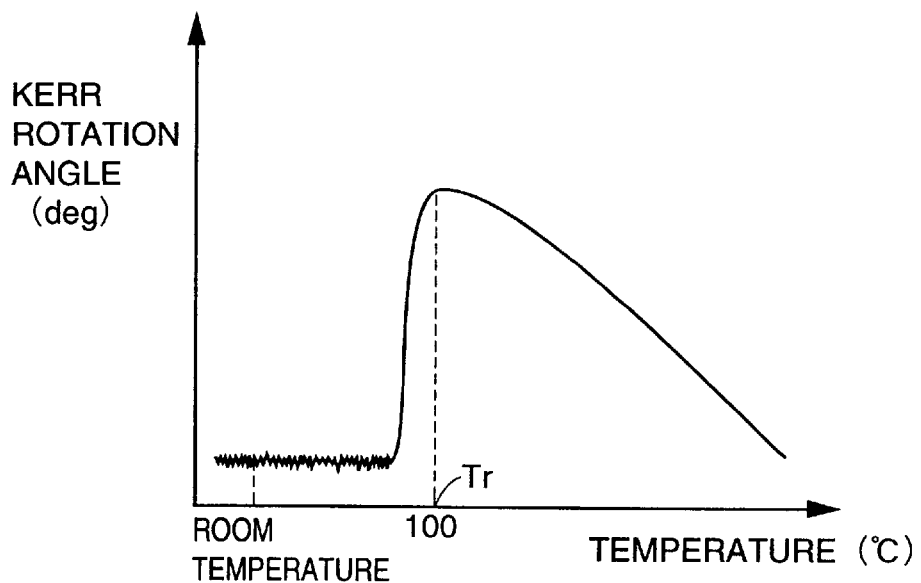
FIG. 3 illustrates temperature dependency of Kerr rotation angle of the gate layer shown in FIG. 1.

As shown in FIG. 2B, when a laser beam LB enters from reproducing layer 3 side, a magnetic domain 70 within recording layer 7 to be reproduced is heated to a reproducing temperature of 100° C. or higher. Gate layer 6 has an in-plane magnetization at a room temperature, for example 0–40° C., and a perpendicular magnetization at the reproducing temperature of 100° C. or higher. Therefore, when the temperature dependency of Kerr rotation angle of gate layer 6 is plotted, Kerr rotation angle is approximately zero at the room temperature, while it steeply increases when the temperature reaches the reproducing temperature Tr (100° C.), as shown in FIG. 3. Thus, a magnetic domain 60 is generated having a sublattice magnetization 61 in the same direction as a sublattice magnetization 71 of a magnetic domain 70. Thus, magnetic domain 70 of recording layer 7 is copied to gate layer 6 by exchange coupling. Magnetic domain 60 copied to gate layer 6 is then copied to magnetic field reinforcement layer 5 by exchange coupling, and a magnetic domain 50 having a sublattice magnetization 51 in the same direction as sublattice magnetization 61 is generated in magnetic field reinforcement layer 5.

Figure 4:
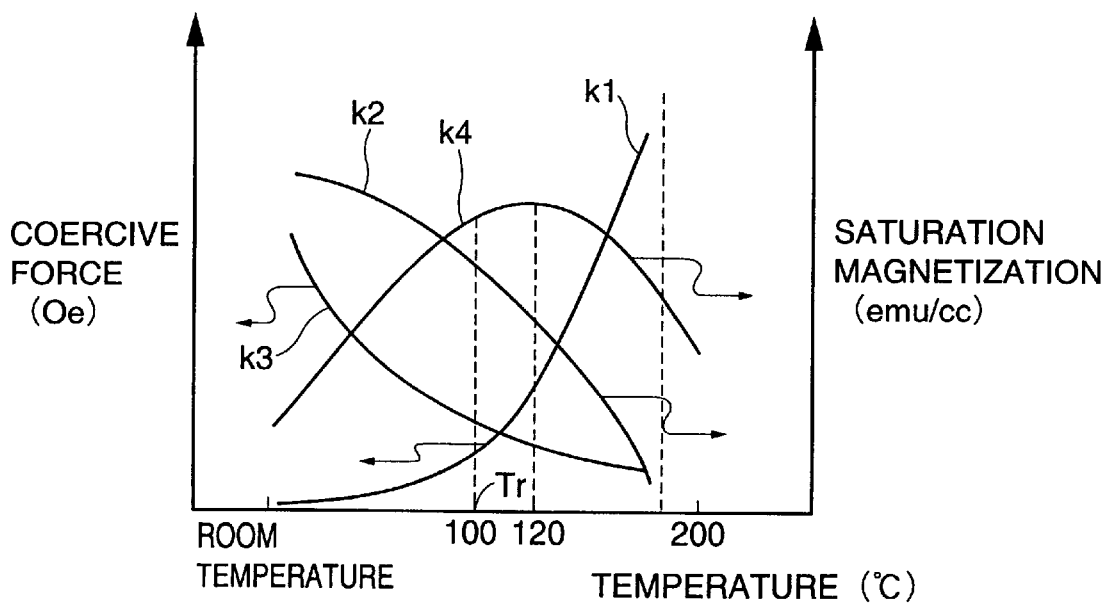
FIG. 4 illustrates temperature dependency of a saturation magnetization and a coercive force of the gate layer and the magnetic reinforcement layer.

Thus, gate layer 6 has a function of selectively extracting each magnetic domain in recording layer 7. To enhance the magnetic domain selectivity of gate layer 6, a magnetic material must be used in which a magnetic domain of recording layer 7 can easily be copied at a relatively low temperature of around 100° C. Gate layer 6 now has such a magnetic property as shown in FIG. 4. In FIG. 4, k1 denotes temperature dependency of a coercive force of gate layer 6, and the curve k2 denotes temperature dependency of saturation magnetization of gate layer 6. The curve k2 clearly shows that the saturation magnetization of gate layer 6 decreases as the temperature raises, resulting in reduction of the leakage magnetic field.

Thus, the leakage magnetic field from gate layer 6 is small at the reproducing temperature Tr, so that it is difficult for gate layer 6 alone to ensure the copy of magnetic domain 60, copied from recording layer 7, to reproducing layer 3 by magneto-static coupling. Therefore, magnetic field reinforcement layer 5 having the magnetic property as shown in FIG. 4 is provided. In FIG. 4, the curve k3 denotes temperature dependency of the coercive force of magnetic field reinforcement layer 5, and the curve k4 denotes temperature dependency of the saturation magnetization of magnetic reinforcement layer 5. As clearly seen from the curve k4, the saturation magnetization of magnetic reinforcement layer 5 is maximized at 120° C., and the saturation magnetization around 120° C. is greater than that of gate layer 6. Therefore, magnetic field reinforcement layer 5 converts magnetic domain 60 with weak saturation magnetization into magnetic domain 50 with strong saturation magnetization, and thus it has the function of reinforcing the leakage magnetic field reaching reproducing layer 3 via blocking layer 4.

Figure 2C:
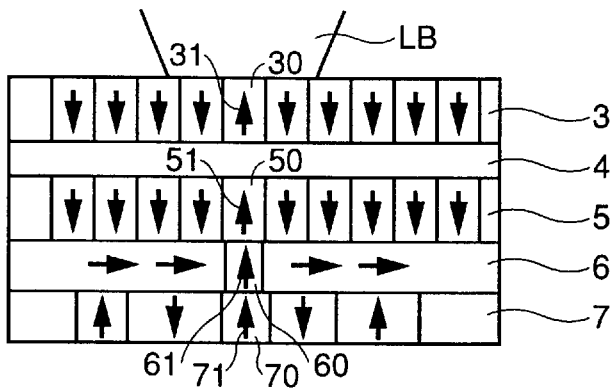
Figure 2D:
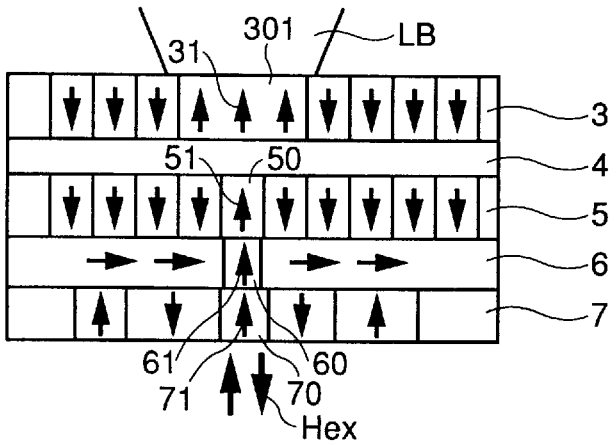

Thus, the saturation magnetization of magnetic domain 50 copied to magnetic field reinforcement layer 5 is maximized at 120° C., so that when the temperature of magneto-optical recording medium 10 is raised to 120° C., the leakage magnetic field from magnetic domain 50 to reproducing layer 3 is maximized, and magnetic domain 50 of magnetic field reinforcement layer 5 is copied to reproducing layer 3 by magneto-static coupling as shown in FIG. 2C. As a result, a magnetic domain 30, having a magnetization 31 in the same direction as magnetization 51 of magnetic domain 50, is generated in reproducing layer 3. When the temperature returns to the room temperature after the signal reproduction, this magnetization 51 of magnetic domain 50 is inverted back to the initial state, so that the diameter of the magnetic domain copied into magnetic reinforcement layer 5 will always be constant.

Thus, in the state where magnetic domain 30 is copied to reproducing layer 3, an external magnetic field Hex (the external magnetic field is an alternating magnetic field having a peak value of ±300 Oe and a frequency of 2–20 MHz, the same applies in the following) is applied from the side of recording layer 7. When the external magnetic filed in the same direction as magnetization 31 of magnetic domain 30 is applied, magnetic domain 30 is enlarged to be magnetic domain 301. At this point, reproducing layer 3 is not in direct contact with a magnetic layer such as magnetic field reinforcement layer 5 and is in direct contact with a non-magnetic layer such as blocking layer 4. Therefore, magnetic domain 30 is positively enlarged into magnetic domain 301, unaffected by the exchange coupling force from magnetic field reinforcement layer 5.

As magnetic domain 30 is enlarged to magnetic domain 301, magnetic domain 301 is detected by a laser beam LB, whereby magnetic domain 70 of recording layer 7 is copied to reproducing layer 3 and enlarged therein, reproducing a signal.

After detection of magnetic domain 301, the external magnetic field in the direction opposite to magnetization 31 of magnetic domain 301 is applied, and magnetic domain 301 is demagnetized back to the initial state shown in FIG. 2A. By repeating the above-described process, the magnetic domain of recording layer 7 is copied in sequence to reproducing layer 3 and enlarged therein, resulting in the reproduction of a signal recorded in recording layer 7.

Figure 5A:
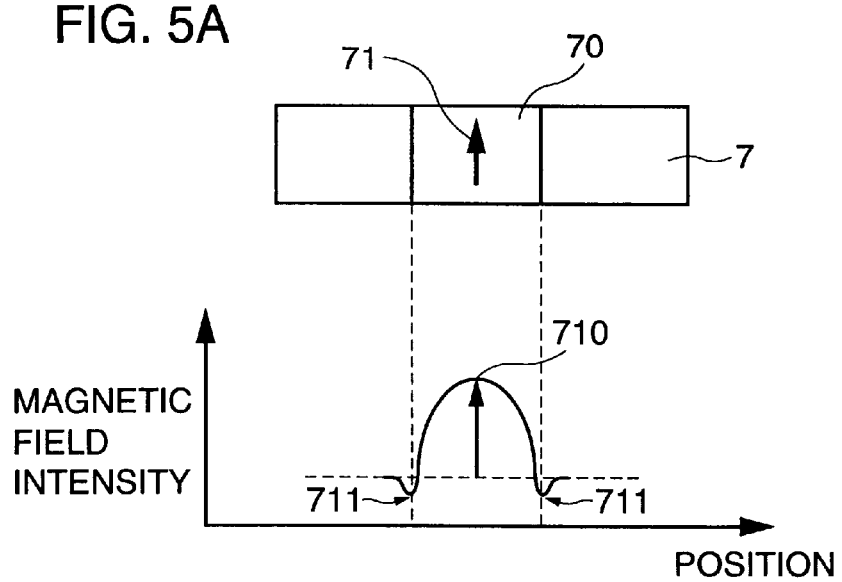
FIG. 5A illustrates an intensity profile of a magnetic field leaking from the short magnetic domain of the recording layer.
Figure 5B:
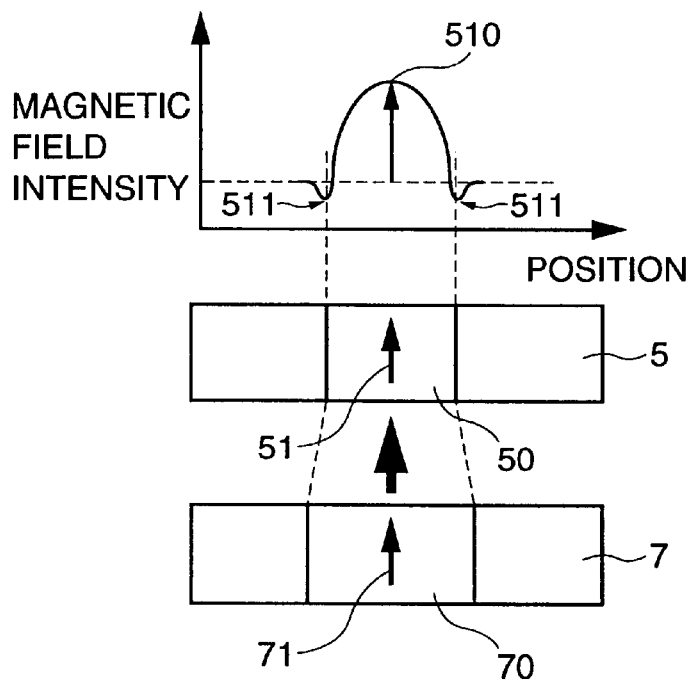
FIG. 5B illustrates an intensity profile of a magnetic field leaking from the magnetic domain copied from the short magnetic domain within the recording layer to the magnetic filed reinforcement layer.

The process of reproducing a signal from relatively short magnetic domain 70 is described above. As shown in FIG. 5A, the maximum magnetic field 710 in the same direction as magnetization 71 exist in the center of magnetic domain 70, and magnetic fields 711 and 711 in the direction opposite to magnetization 71 exists at the opposing ends of magnetic domain 70. Therefore, in the intensity profile of the leakage magnetic field from relatively short magnetic domain 70, the magnetic field intensity increases from the opposing ends of magnetic domain 70 toward the center thereof. As shown in FIG. 5B, short magnetic domain 70 within recording layer 7 is copied to magnetic field reinforcement layer 5 as magnetic domain 50. This magnetic domain 50 is short, as magnetic domain 70, so that the intensity profile of the leakage magnetic field from magnetic domain 50 will be similar to the one from magnetic domain 70 described above. Thus, maximum magnetic field 510 in the same direction as magnetization 51 exists at the center of magnetic domain 50, and magnetic fields 511 and 511 exist in the opposing direction to magnetization 51 at the opposite ends of magnetic domain 50. As a result, magnetic domain 50 is reliably copied to reproducing layer 3 by magneto-static coupling.

A signal reproducing process having a long magnetic domain length is now described with reference to FIGS. 6A through 6D.

Figure 6A:
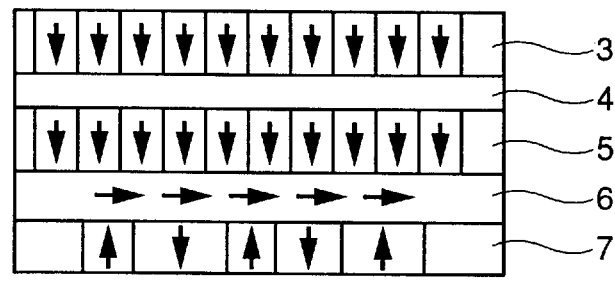
FIGS. 6A to 6D illustrate a process of reproducing a signal from a long magnetic domain in the magneto-optical recording medium shown in FIG. 1.

Similar to FIG. 2, each magnetic layer 3, 5, 6 and 7 of magneto-optical recording medium 10 is magnetized in the initial state, as shown in FIG. 6A.

Figure 6B:
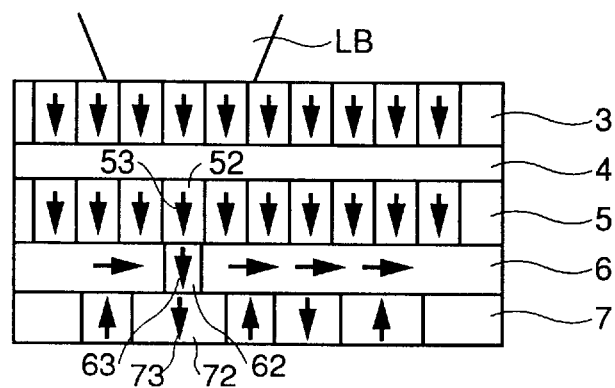
Figure 6C:
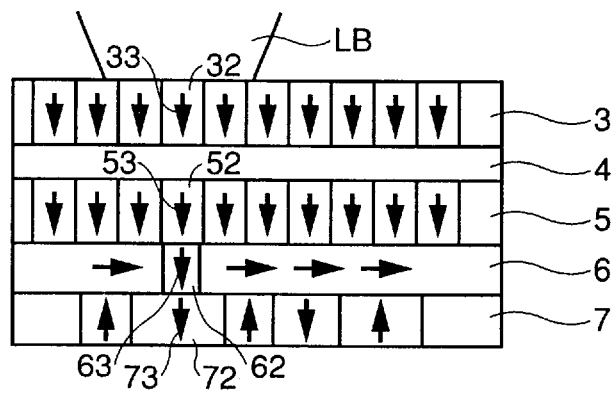

Thereafter, as shown in FIG. 6B, laser beam LB is directed from the side of reproducing layer 3, and when a magnetic domain 72 of recording layer 7 reaches 100° C., magnetic domain 72 of recording layer 7 is copied to gate layer 6, generating, within gate layer 6, magnetic domain 62 having magnetization 63 in the same direction as a magnetization 73. The length of this magnetic domain 62 is shorter than that of magnetic domain 72, and approximately the same as magnetic domain 60 shown in FIG. 2B. Thus, GdFeCo forming gate layer 6 is magnetic material, which changes, when the temperature exceeds 100° C., from in-plane magnetization film to perpendicular magnetization film in a smaller region than the minimum magnetic domain of recording layer 7. Therefore, gate layer 6 selectively extracts each magnetic domain independent of the length of the magnetic domain formed in recording layer 7, and copies, as subsequently described, the extracted magnetic domain into reproducing layer 3 via magnetic field reinforcement layer 5 and blocking layer 4.

Magnetic domain 62 copied to gate layer 6 is further copied as magnetic domain 52 into magnetic field reinforcement layer 5 by exchange coupling.

As described above, the saturation magnetization of magnetic reinforcement layer 5 is maximized at 120° C., and the leakage magnetic field reaching reproducing layer 3 from magnetic domain 52 is also maximized. As a result, magnetic domain 52 is copied to reproducing layer 3 via blocking layer by magneto-static coupling, whereby a magnetic domain 32 having a magnetization 33 in the same direction as magnetization 53 is generated in reproducing layer 3.

Figure 6D:
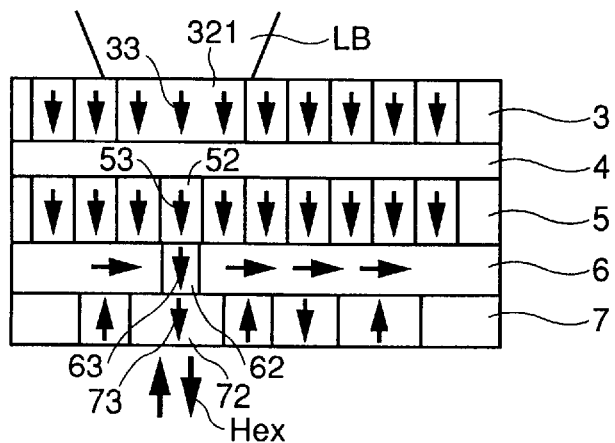

In such a state in that reproducing layer 3 is copied, alternating magnetic field Hex is externally applied as shown in FIG. 6D. When the magnetic field in the same direction as magnetization 33 of magnetic domain 32 is applied, magnetic domain 32 is enlarged into a magnetic domain 321. This enlarged magnetic domain 321 is detected by laser beam LB, thereby reproducing a signal recorded in recording layer 7.

Figure 7A:
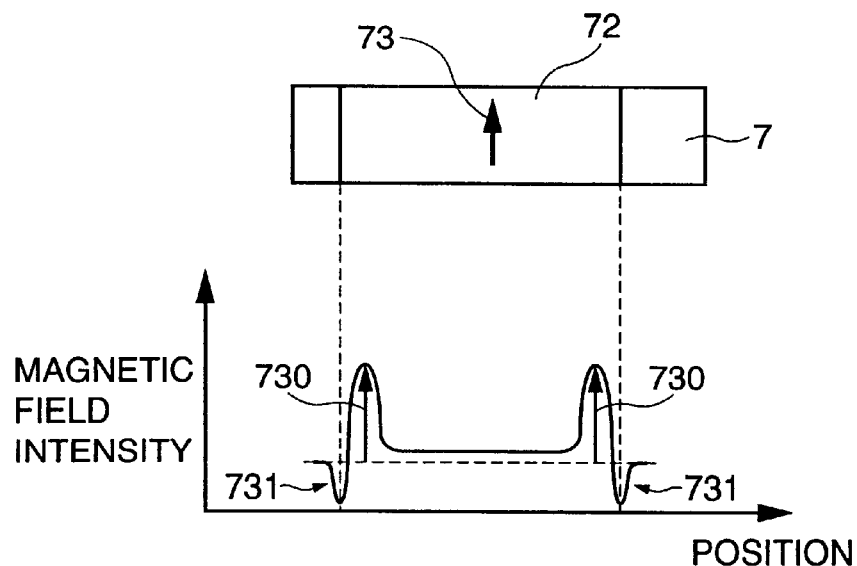
FIG. 7A illustrates an intensity profile of the magnetic field leaking from the long magnetic domain in the recording layer.

When the magnetic domain length is long, the intensity profile of its leakage magnetic field has such a shape as shown in FIG. 7A. In this magnetic field profile, magnetic fields 730 and 730 in the same direction as magnetization 73 exist near the opposing ends of magnetic domain 72, and magnetic fields 731 and 731 in the direction opposite to magnetization 73 exist at the opposing ends of magnetic domain 72. The magnetic field intensity at the center of magnetic domain 72 is very weak. Therefore, it is difficult to copy such a long magnetic domain 72 directly to reproducing layer 3 by magneto-static coupling.

Figure 7B:
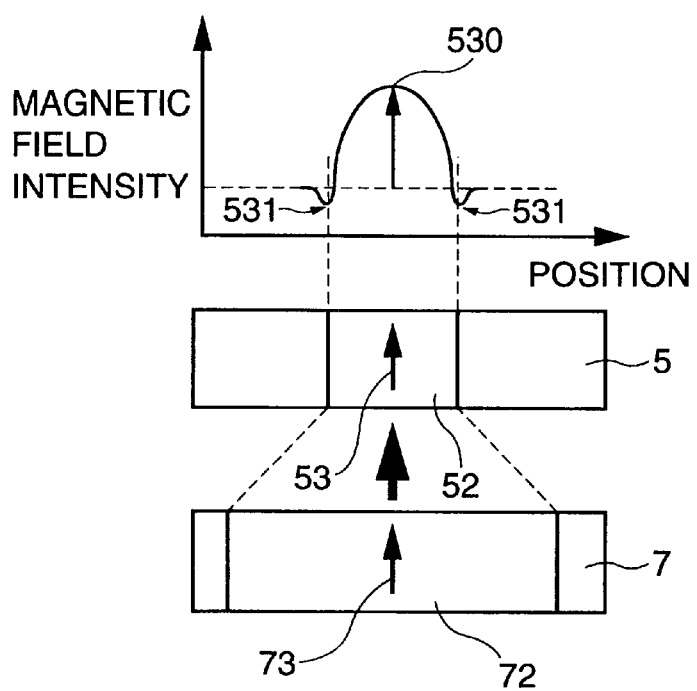
FIG. 7B illustrates an intensity profile of a magnetic field leaking from the magnetic domain copied from the long magnetic domain within the recording layer to the magnetic field reinforcement layer.

However, in this magneto-optical recording medium, gate layer 6 is formed in contact with recording layer 7, so that magnetic domain 72 of recording layer 7 is copied to gate layer 6 by exchange coupling as descried above, and is further copied to magnetic field reinforcement layer 5. Further, the length of magnetic domain 52 generated in magnetic field reinforcement layer 5 by the copy of long magnetic domain 72 is the same as the length of magnetic domain 50 generated in magnetic field reinforcement layer 5 by the copy of short magnetic domain 70, so that the intensity profile of the leakage magnetic field from magnetic domain 52 is, as shown in FIG. 7B, the same as the one shown in FIG. 5B. Thus, in this magnetic field profile, the maximum magnetic field 530 in the same direction as magnetization 53 exists at the center of magnetic domain 52, and magnetic fields 531 and 531 in the direction opposite to magnetization 53 exist at the opposing ends of magnetic domain 52. Therefore, this magnetic domain 52 of magnetic field reinforcement layer 5 is also reliably copied to reproducing layer 3 by magneto-static coupling.

Next, a method of forming each of the layers 2 through 8 of magneto-optical recording medium 10 is described.

SiN of buffer layer 2 is formed by RF magnetron spattering method, and SiN is used as a target. Ar gas flow rate, gas pressure, substrate temperature, and RF power are as shown in Table 1 below.

TABLE 1

| Conditions for Formation of Buffer Layer | |
|---|---|
| Ar gas flow rate (sccm) | 50–80 |
| gas pressure (mTorr) | 6–10 |
| target | SiN |
| substrate temperature (° C.) | 50–70 |
| RF power (w/cm$^2$) | 2.5–3.5 |

GdFeCo of reproducing layer 3 is also formed by RF magnetron spattering method, and Gd and FeCo are used for a target. Ar gas flow rate, gas pressure, substrate temperature, and RF power are as shown in Table 2 below. RF power is herein independently applied to each target.

TABLE 2

| Conditions for Formation of Reproducing Layer | | |
|---|---|---|
| Ar gas flow rate (sccm) | | 50–80 |
| Gas pressure (mTorr) | | 6–10 |
| Target | | Gd, FeCo |
| Substrate temperature (° C.) | | 50–70 |
| RF power (w/cm$^2$) | Gd | 1.8–2.2 |
| | FeCo | 1.8–2.2 |

Further, SiN of blocking layer 4 is also formed by RF magnetron spattering method, and SiN is used as a target. Ar gas flow rate, gas pressure, substrate temperature, and RF power are as shown in Table 3 below.

TABLE 3

| Conditions for Formation of Blocking Layer | |
|---|---|
| Ar gas flow rate (sccm) | 50–80 |
| gas pressure (mTorr) | 6–10 |
| target | SiN |
| substrate temperature (° C.) | 50–70 |
| RF power (w/cm$^2$) | 2.5–3.5 |

Further, GdFeCo of magnetic field reinforcement layer 5 is formed by RF magnetron spattering method, and Gd and FeCo are used as a target. Ar gas flow rate, gas pressure, substrate temperature, and RF power are as shown in Table 4 below. RF power is herein also independently applied to each target. The compensation temperature Tcomp of GdFeCo formed under this condition will be −30° C.<Tcomp<50° C. Therefore, this magnetic field reinforcement layer 5 will quickly return to the initial magnetized state as the temperature goes back to the room temperature after detection of the enlarged magnetic domain 301 or 321 by laser beam LB.

TABLE 4

Conditions for Formation of Magnetic Field Reinforcement Layer

| Ar gas flow rate (sccm) | | 50–80 |
|---|---|---|
| gas pressure (mTorr) | | 6–10 |
| target | | Gd, FeCo |
| substrate temperature (° C.) | | 50–70 |
| RF power (w/cm$^2$) | Gd | 1.8–2.2 |
| | FeCo | 1.8–2.2 |

GdFeCo of gate layer 6 is also formed by RF magnetron spattering method, and Gd and FeCo are used as a target. Ar gas flow rate, gas pressure, substrate temperature, and RF power are as shown in Table 5 below. RF power is herein also independently applied to each target. The RF power applied to the Gd target is greater than that applied to the Gd target shown in FIG. 4.

TABLE 5

Conditions for Formation of Gate Layer

| Ar gas flow rate (sccm) | | 50–80 |
|---|---|---|
| gas pressure (mTorr) | | 6–10 |
| Target | | Gd, FeCo |
| substrate temperature (° C.) | | 50–70 |
| RF power (w/cm$^2$) | Gd | 2.0–2.4 |
| | FeCo | 1.8–2.2 |

TbFeCo of recording layer 7 is also formed by RF magnetron spattering method, and TbFeCo is used as a target. Ar gas flow rate, gas pressure, substrate temperature, and RF power are as shown in the Table 6 below.

TABLE 6

Conditions for Formation of Recording Layer

| Ar gas flow rate (sccm) | 50–80 |
|---|---|
| gas pressure (mTorr) | 6–10 |
| target | TbFeCo |
| substrate temperature (° C.) | 50–70 |
| RF power (w/cm$^2$) | 1.5–2.5 |

Further, SiN of protective layer is also formed by RF magnetron spattering method, and SiN is used as a target. Ar gas flow rate, gas pressure, substrate temperature, and RF power are as shown in Table 7 below.

TABLE 7

Conditions for Formation of Protective Layer

| Ar gas flow rate (sccm) | 50–80 |
|---|---|
| gas pressure (mTorr) | 6–10 |
| Target | SiN |
| Substrate temperature (° C.) | 50–70 |
| RF power (w/cm$^2$) | 2.5–3.5 |

As described above, the fact that all layers 2 through 8 of this magneto-optical recording medium 10 can be formed by RF magnetron spattering method means excellent mass productivity.

Therefore, according to the first embodiment of the invention, since blocking layer 4 is formed between reproducing layer 3 and magnetic field reinforcement layer 5, the exchange coupling force from magnetic field reinforcement layer 5 to reproducing layer 3 is blocked and the enlargement of magnetic domain 30 or 32 copied to reproducing layer 3 can be facilitated. Moreover, since gate layer 6 is formed in contact with recording layer 7, each magnetic domain 70 or 72 of recording layer 7 is selectively extracted. As a result, magnetic domain 60 or 62 always having the same length independently of the magnetic field length of recording layer 7 can be obtained. Further, since magnetic reinforcement layer 5 is formed in contact with gate layer 6, the leakage magnetic field reaching from magnetic reinforcement layer 5 to reproducing layer 3 is reinforced. As a result, magnetic domain 50 or 52 extracted from recording layer 7 can reliably be copied to reproducing layer 3 by magneto-static coupling.

Second Embodiment

Figure 8:
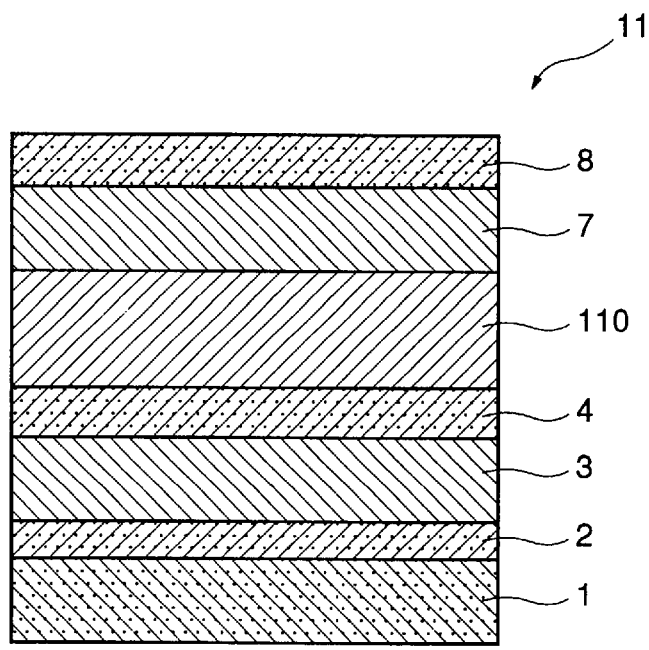
FIG. 8 is a sectional view illustrating the structure of a magneto-optical recording medium according to the second embodiment of the invention.
Figure 9:
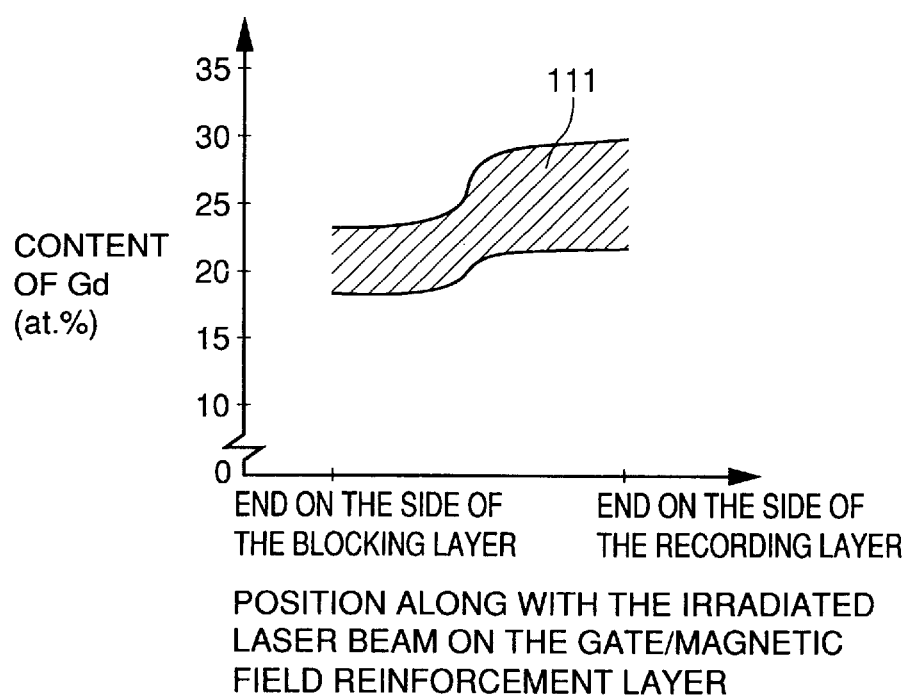
FIG. 9 illustrates a profile of the percentage content of Gd in the gate/magnetic field reinforcement layer shown in FIG. 8.

Referring to FIG. 8, in a magneto-optical recording medium 11 according to the second embodiment of the invention, a gate/magnetic field reinforcement layer 110 is formed in place of gate layer 6 and magnetic field reinforcement layer 5 in the above-described first embodiment. This gate/magnetic field reinforcement layer 110 is made of GdFeCo, and the percentage content of Gd is 18–23 at. % at the end on the side of blocking layer 4 and 22–30 at. % at the end on the side of recording layer 7. Thus, the percentage content of Gd within gate/magnetic field reinforcement layer 110 gradually decreases within the shaded area shown in FIG. 9, from the side of recording layer 7 toward the side of blocking layer 4. The saturation magnetization of gate/magnetic field reinforcement layer 110 at 100° C. thereby increases from the side of recording layer 7 toward the side of blocking layer 4. Thus, this gate/magnetic field reinforcement layer 110 has the functions of both gate layer 6 and magnetic field reinforcement layer 5 in the above-described first embodiment. As a result, gate/magnetic field reinforcement layer 110 selectively extracts each magnetic domain within recording layer 7, and reinforces the leakage magnetic field reaching reproducing layer 3 to more positively copy the extracted magnetic domain into reproducing layer 3 via blocking layer 4.

Each layer in this magneto-optical recording medium 11 is also formed by RF magnetron spattering method under the conditions shown in Tables 1 through 7 above. Gate/magnetic field reinforcement layer 110 has a thickness of 1400–3000 Å.

Third Embodiment

Figure 10:
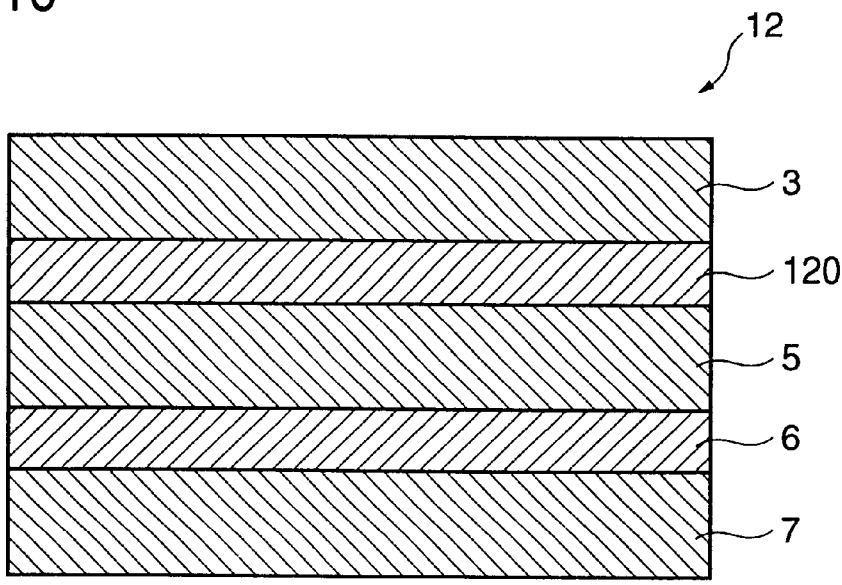
FIG. 10 is a sectional view illustrating the structure of the magneto-optical recording medium according to the third embodiment of the invention.

Referring to FIG. 10, in a magneto-optical recording medium 12 according to the third embodiment of the invention, a blocking layer 120 made of magnetic material is formed in place of blocking layer 4 made of non-magnetic material in the above-described first embodiment. Blocking layer 120 is, more particularly, made of $Tb_{15-40}(Fe_{85-100}Co_{0-15})_{60-85}$ (the subscripts denote the percentage content for each component atoms), and has a thickness of 30–300 Å.

Figure 11:
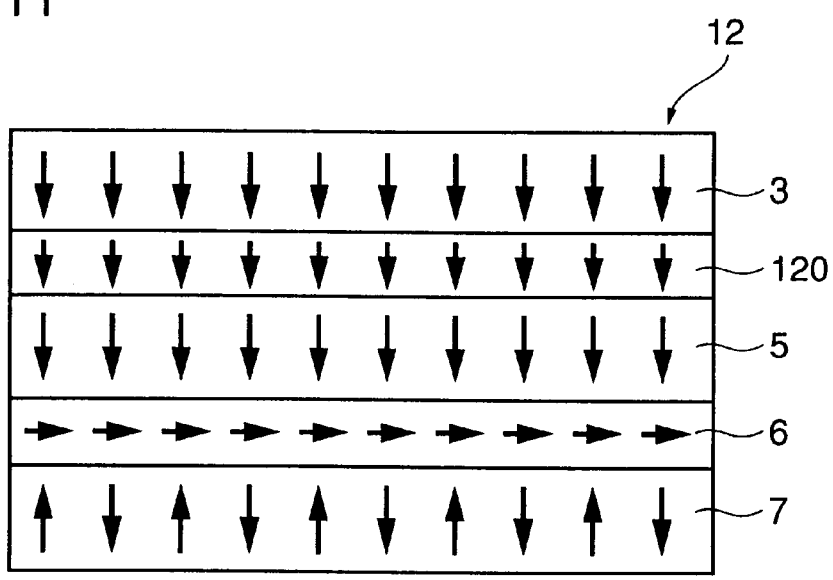
FIG. 11 illustrates an initial magnetization state of the magneto-optical recording medium shown in FIG. 10.

The material forming blocking layer 120 has a perpendicular magnetization at a room temperature as shown in FIG. 11. Thus, blocking layer 120 is magnetized by the initialization magnetic field in the same direction as reproducing layer 3 and magnetic field reinforcement layer 5.

Figure 12:
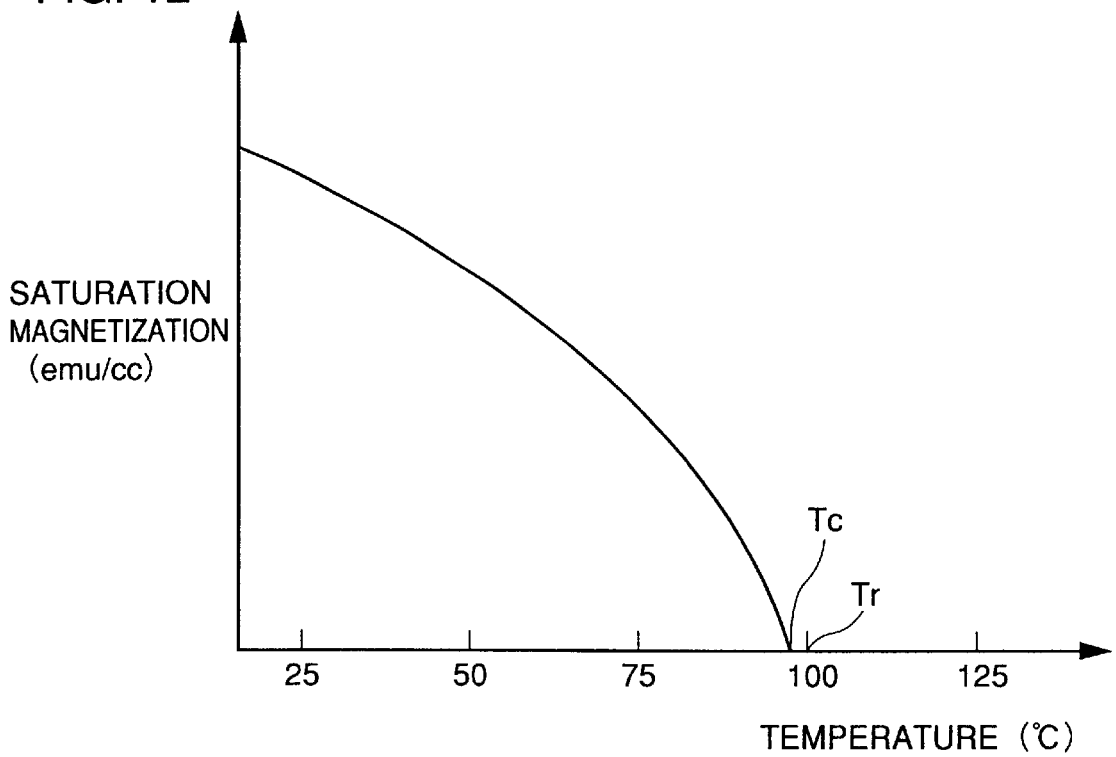
FIG. 12 illustrates temperature dependency of the saturation magnetization of the blocking layer shown in FIG. 10.

Further, the magnetic material has Curie temperature lower than the reproducing temperature of 100° C., as shown in FIG. 12. The saturation magnetization becomes zero when the temperature exceeds Curie temperature.

Figure 13:
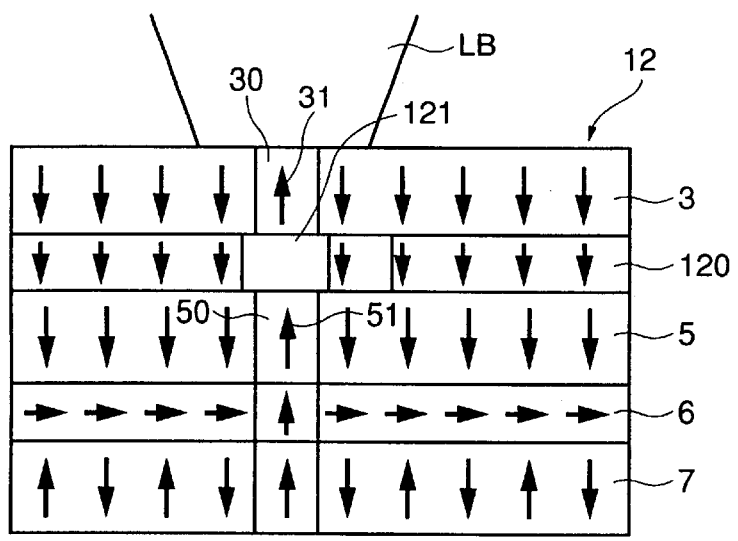
FIG. 13 illustrates a magnetization state in which the magneto-optical recording medium shown in FIG. 10 is irradiated with a laser beam.
Figure 14:
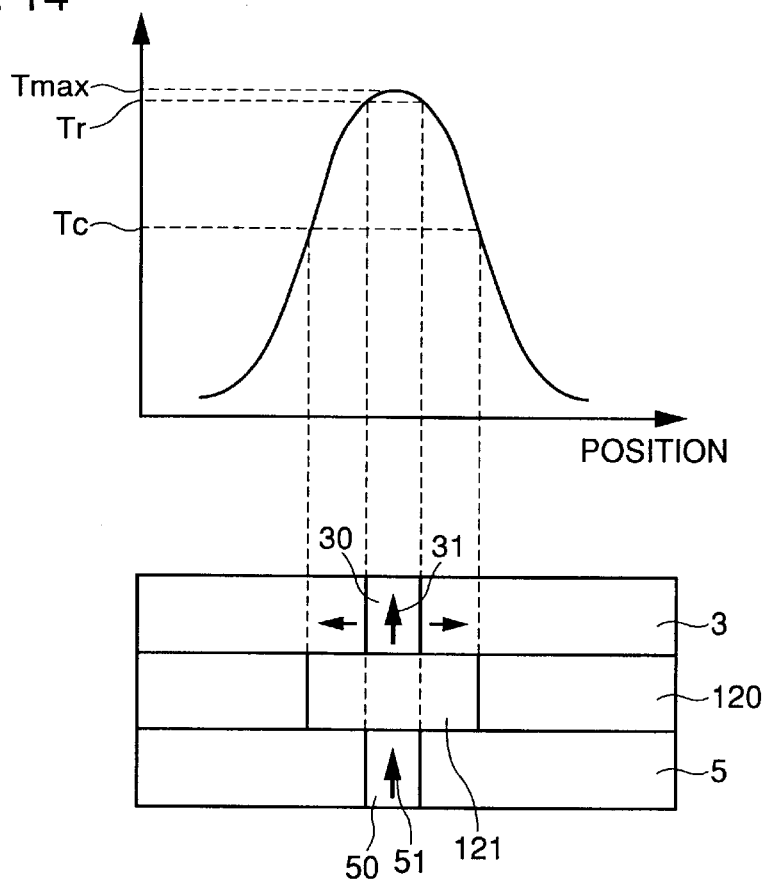
FIG. 14 illustrates a temperature profile of the portion irradiated with the laser beam shown in FIG. 10.

When such a magneto-optical recording medium 12 is irradiated with laser beam LB as shown in FIG. 13, the temperature of the irradiated portion is raised as shown in FIG. 14. Curie temperature Tc of blocking layer 120 is lower than the maximum temperature Tmax of the heated portion and is also lower than reproducing temperature Tr (<Tmax), so that a portion 121 within blocking layer 120 exceeding Curie temperature Tc is demagnetized. Thus, magnetic domain 50 in magnetic filed reinforcement layer 5 is copied into reproducing layer 3 by magneto-static coupling, thereby generating a magnetization 30 within reproducing layer 3. Demagnetized portion 121 in blocking layer 120 blocks the exchange coupling force from magnetic reinforcement layer 5 to reproducing layer 3, so that magnetic domain 30 is smoothly enlarged when the magnetic field in the same direction as magnetization 31 is applied.

Blocking layer 120 can also be formed by RF magnetron spattering method, as the other layers 3, 5, 6 and 7.

According to the above-described third embodiment, since blocking layer 120 is also formed by magnetic material, similar to the other layers 3, 5, 6 and 7, each layer has a good film quality.

Fourth Embodiment

Figure 15:
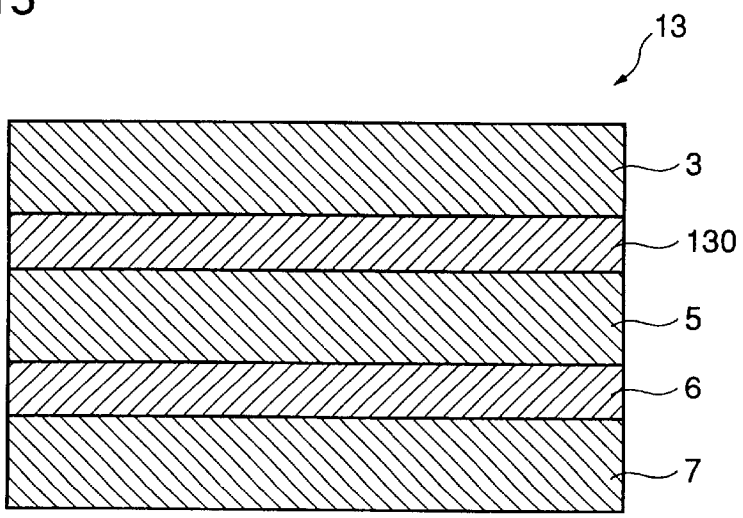
FIG. 15 is a sectional view of the structure of a magneto-optical recording medium according to the fourth embodiment of the invention.

Referring to FIG. 15, in a magneto-optical recording medium 13 according to the fourth embodiment of the invention, blocking layer 130 made of $Tb_{15-40}(Fe_{65-92}Co_{8-35})_{60-85}$ is formed in place of blocking layer 120 according to the above-described third embodiment, the thickness thereof being 30–300 Å.

Figure 16:
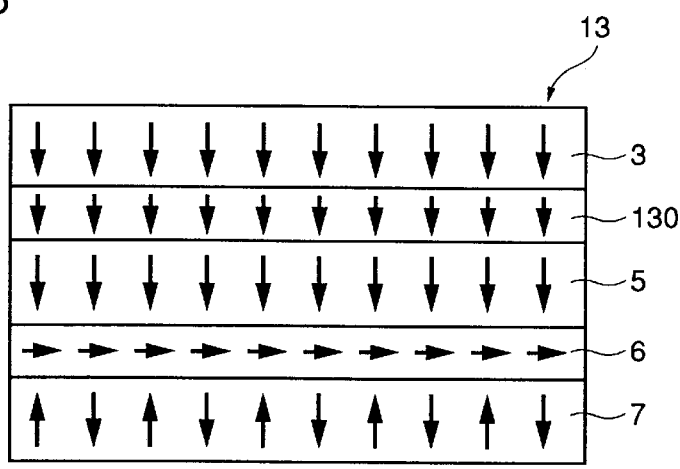
FIG. 16 illustrates an initial magnetization state of a magneto-optical recording medium shown in FIG. 15.
Figure 17:
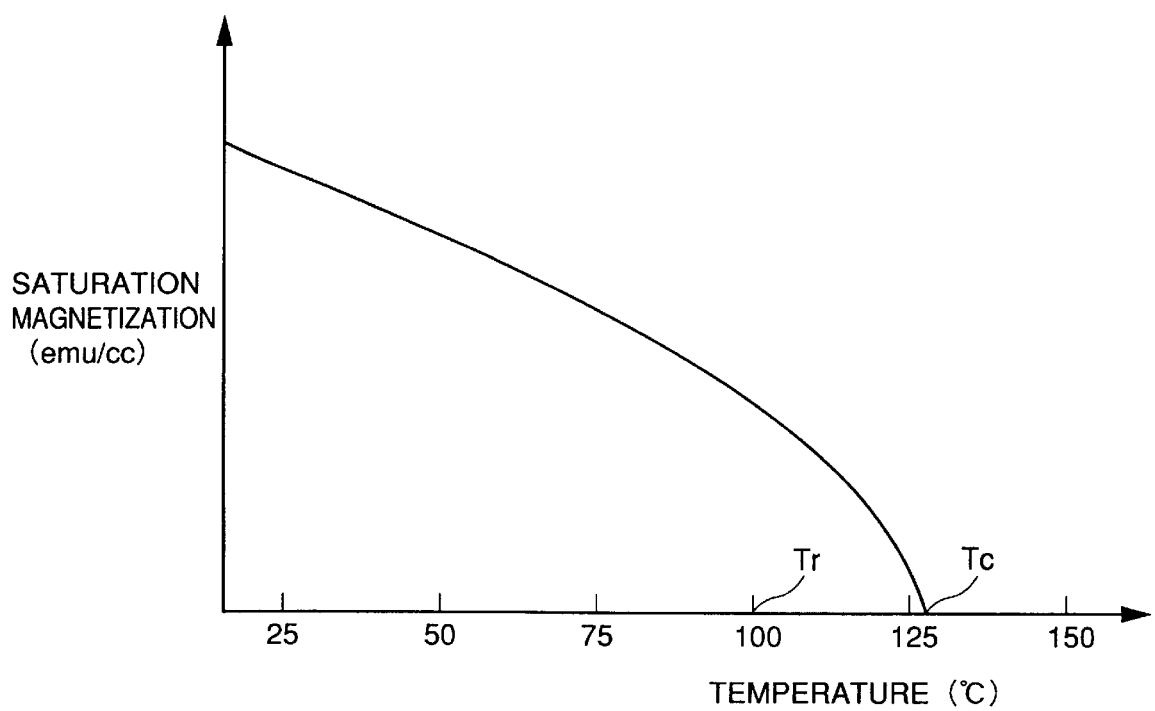
FIG. 17 illustrates temperature dependency of the saturation magnetization of the blocking layer shown in FIG. 15.

The magnetic material of blocking layer 130 has a perpendicular magnetization at a room temperature as shown in FIG. 16. Further, the magnetic material has Curie temperature Tc higher than reproducing temperature Tr (100° C.) as shown in FIG. 17.

Figure 18:
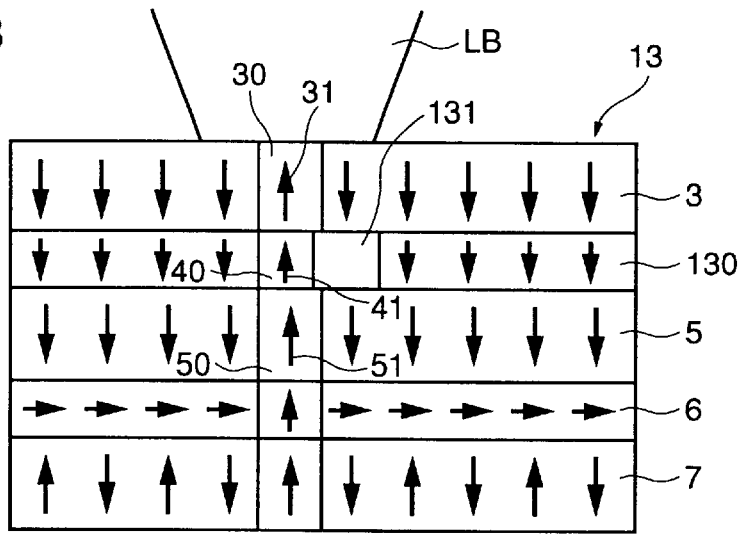
FIG. 18 illustrates a magnetization state in which the magneto-optical recording medium shown in FIG. 15 is irradiated with a laser beam.
Figure 19:
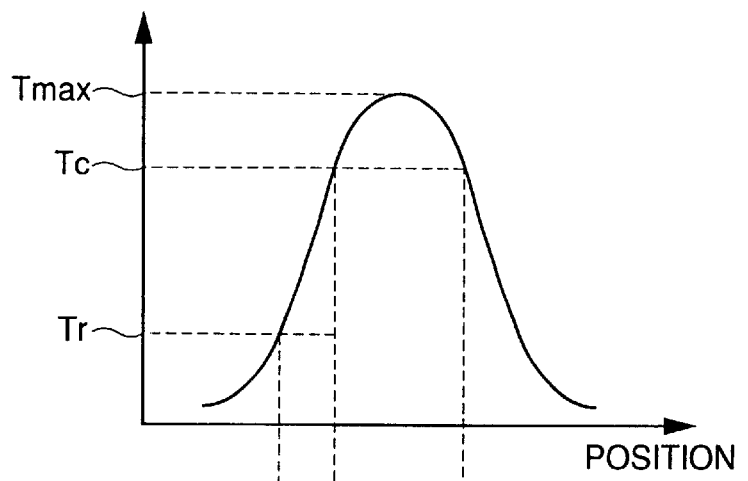
FIG. 19 illustrates a temperature profile of the portion irradiated with the laser beam shown in FIG. 18.
Figure 19:
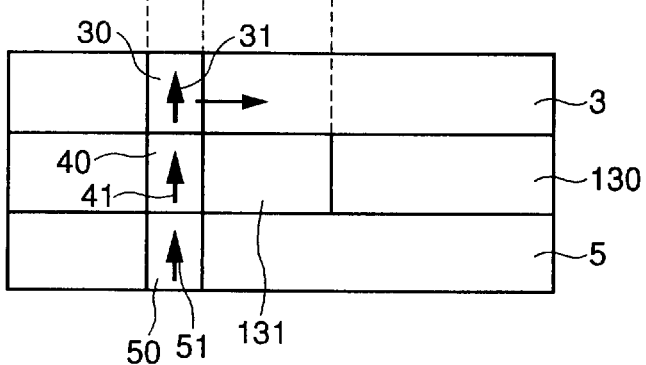

When such magneto-optical recording medium 13 is irradiated with laser beam LB as shown in FIG. 18, the temperature of the irradiated portion is raised. As shown in FIG. 19, the highest temperature is not at the center of laser beam LB, but in practice, a portion behind the direction of travel. Curie temperature Tc is lower than the maximum temperature Tmax at the portion where the temperature is raised by laser beam LB. Thus, that portion 131 of blocking layer 130, which temperature is higher than Curie temperature Tc, is demagnetized. Here, the temperature of the magnetic domain in which a signal should be reproduced (reproducing temperature Tr) is lower than Curie temperature Tc, so that magnetization 41 in blocking layer 130 is not demagnetized. As a result, magnetic domain 50 within magnetic field reinforcement layer 5 is copied into blocking layer 130 by the exchange coupling, and the copied magnetic domain 40 is further copied into reproducing layer 3 by exchange coupling, generating magnetic domain 30 within reproducing layer 3.

Demagnetized portion 131 thus blocks the exchange coupling force from magnetic reinforcement layer 5 to reproducing layer 3, so that magnetic domain 30 is smoothly enlarged when a magnetic field in the same direction as magnetization 31 is applied.

According to the above-described fourth embodiment, magnetic domain 50 within magnetic field reinforcement layer 5 is copied to reproducing layer 3 by exchange coupling, so that magnetization 30 having magnetization 31 in the same direction as magnetization 51 of magnetic domain 50 is more reliably generated within reproducing layer 3.

Fifth Embodiment

Figure 20:
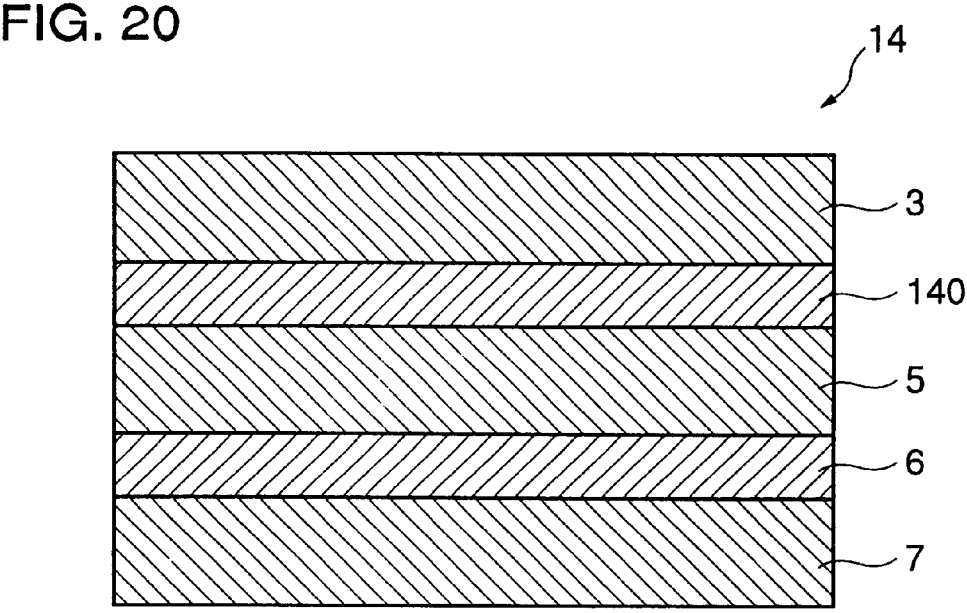
FIG. 20 is a sectional view of a structure of the magneto-optical recording medium according to the fifth embodiment of the invention.

Referring to FIG. 20, in a magneto-optical recording medium 14 according to the fifth embodiment of the invention, blocking layer 140 made of $Gd_{22-30}(Fe_{65-90}Co_{10-35})_{70-78}$ is formed in place of blocking layer 130 in the above-described fourth embodiment. Blocking layer 140 has a thickness of 300–1500 Å.

Figure 21:
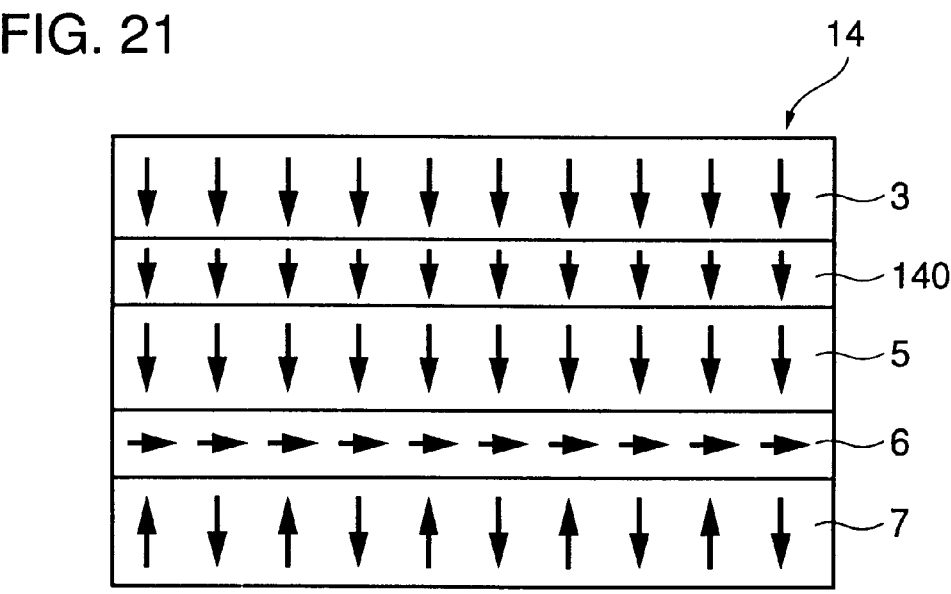
FIG. 21 illustrates an initial magnetization state of the magneto-optical recording medium shown in FIG. 20.

Blocking layer 140 also has a perpendicular magnetization at a room temperature as shown in FIG. 21. Blocking layer 140, however, changes from a perpendicular magnetization to an in-plane magnetization at a predetermined temperature lower than the maximum temperature Tmax shown in FIG. 19 and higher than the reproducing temperature Tr.

Figure 22:
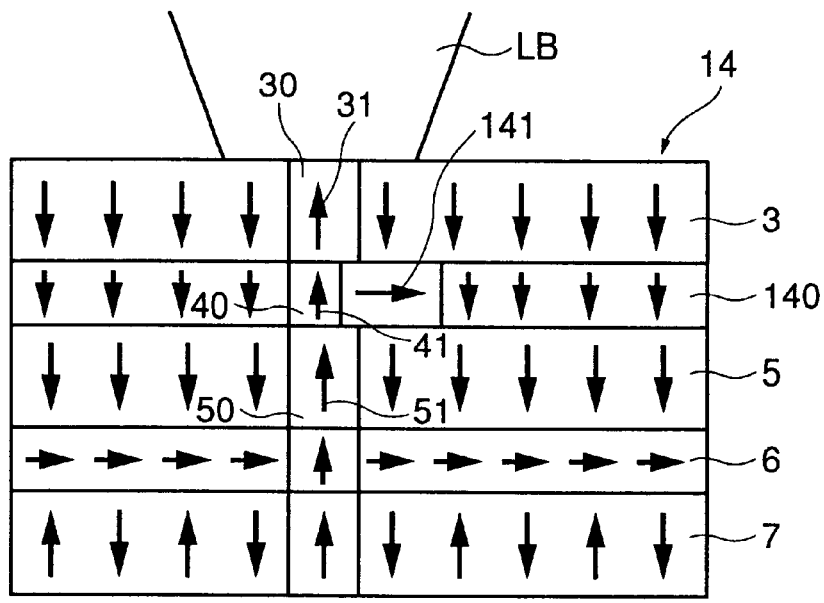
FIG. 22 illustrates a magnetization state in which the magneto-optical recording medium shown in FIG. 20 is irradiated with a laser beam.

When such magneto-optical recording medium 14 is irradiated with laser beam LB as shown in FIG. 22, the temperature of the magnetic domain from which a signal should be reproduced is raised. A portion 141 in blocking layer 140, now having a temperature higher than the above-described predetermined temperature, comes to be an in-plane magnetization film.

Thus, similar to the above-described fourth embodiment, magnetic domain 50 within magnetic field reinforcement layer 5 is copied to blocking layer 140 by exchange coupling, and the copied magnetic domain 40 is further copied to reproducing layer 3 by exchange coupling, thereby generating magnetic domain 30 within reproducing layer 3. Portion 141, now being an in-plane magnetization film, blocks the exchange coupling force from magnetic field reinforcement layer 5 to reproducing layer 3, so that magnetic domain 30 is smoothly enlarged when the magnetic field in the same direction as magnetization 31 is applied.

Sixth Embodiment

Figure 23:
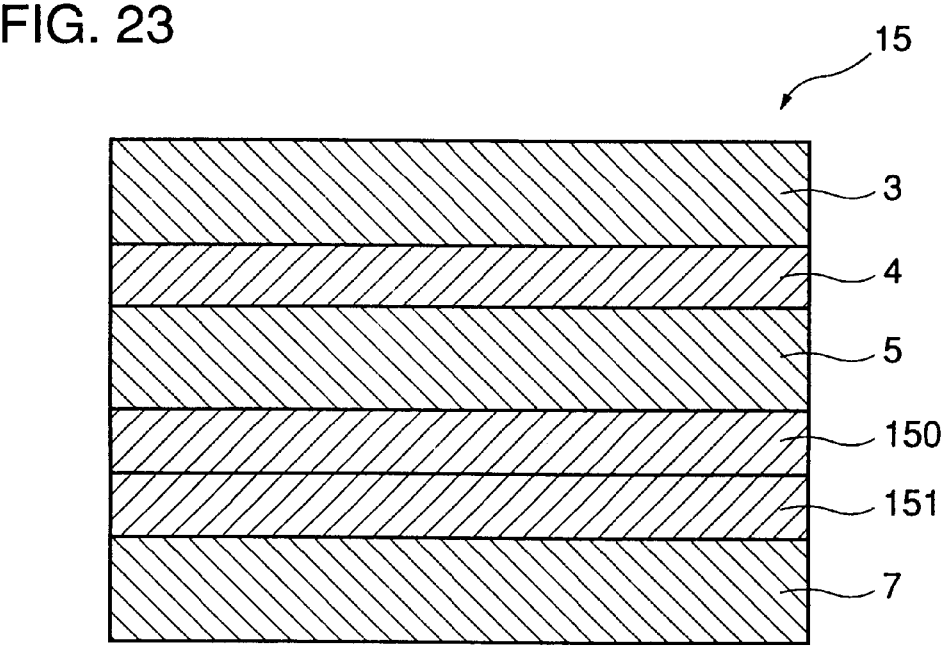
FIG. 23 is a sectional view of a structure of the magneto-optical recording medium according to the sixth embodiment of the invention.

Referring to FIG. 23, in a magneto-optical recording medium 15 according to the sixth embodiment of the invention, mask layers 150 and 151 are formed in place of gate layer 6 in the above-described first embodiment. The percentage content of Gd in GdFeCo forming reproducing layer 3 is 18–28 at. % or 25–34 at. %, and the percentage content of Gd in GdFeCo forming magnetic field reinforcement layer 5 is 15–31 at. % or 15–25 at. %.

Mask layer 150 is made of GdFeCo, the percentage content of Gd being 25–35 at. % or 28–37 at. %. Mask layer 151 is also made of GdFeCo, and the percentage content of Gd is 20–25 at. %, 18–28 at. %, or 19–25 at. %. Similar to the other layers 3, 4, 5 and 7, mask layers 150 and 151 are also formed by RF magnetron spattering method.

Figure 24:
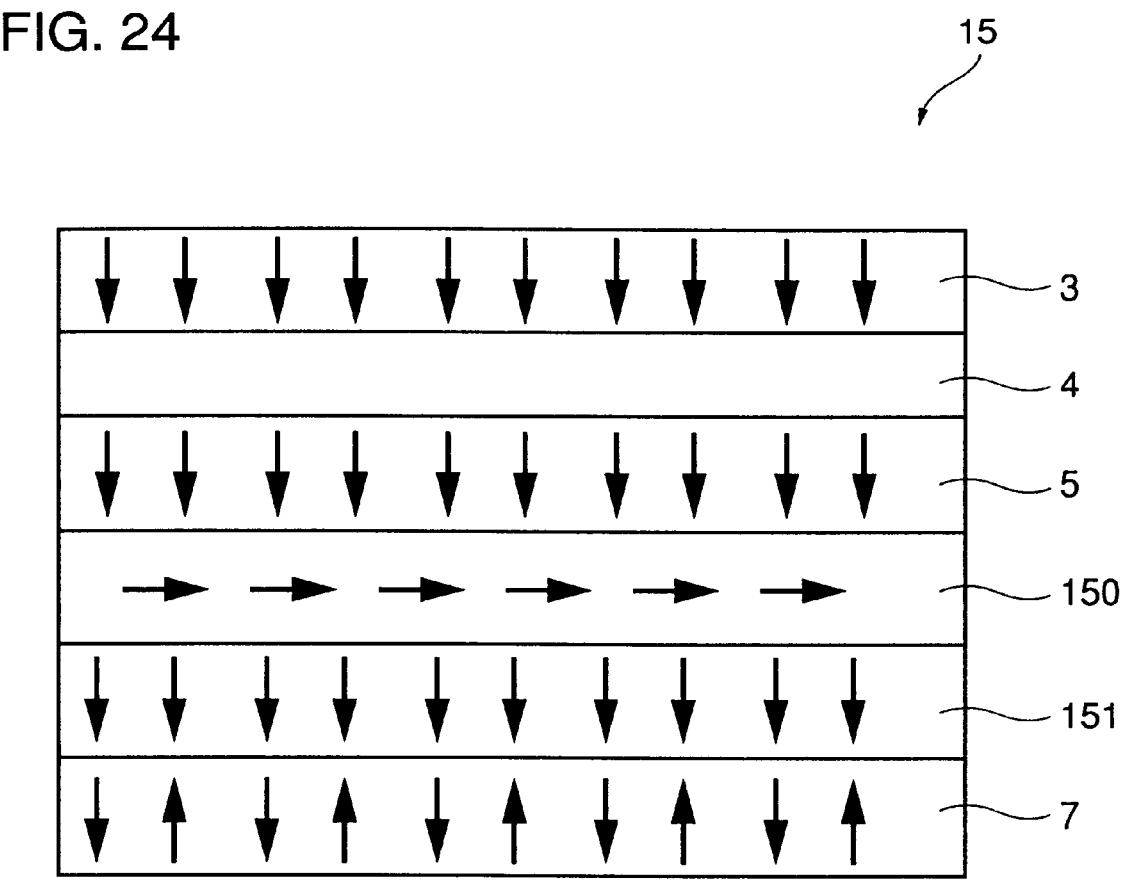
FIG. 24 illustrates an initial magnetization state of the magneto-optical recording medium shown in FIG. 23.

Mask layer 150 has an in-plane magnetization at a room temperature as shown in FIG. 24 and a perpendicular magnetization at a reproducing temperature or higher as will be subsequently described. Mask layer 151 has a perpendicular magnetization at a room temperature and an in-plane magnetization at a predetermined temperature higher than the reproducing temperature as subsequently described. Thus, mask layer 151 is magnetized in the same direction as these layers 3 and 5 by the initialization magnetic field, simultaneously with reproducing layer 3 and magnetic reinforcement layer 5.

Figure 25:
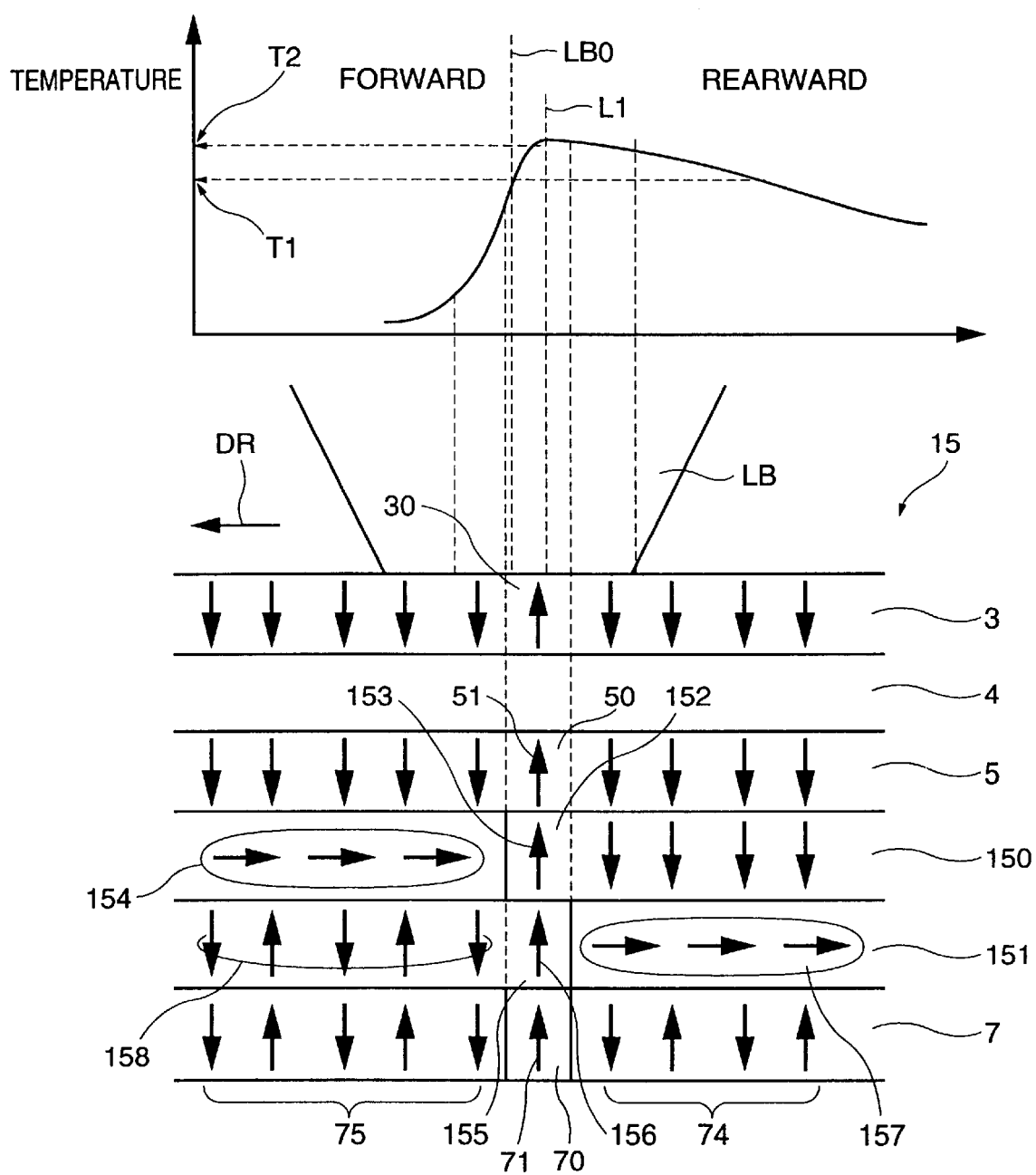
FIG. 25 illustrates a magnetization state in which the magneto-optical recording medium shown in FIG. 23 is irradiated with a laser beam.

Referring to FIG. 25, the mechanism in which each magnetic domain of recording layer 7 is copied to reproducing layer 3 with a high resolution, is described in detail. When magneto-optical recording medium 15 rotating at a predetermined number of rotation is irradiated with laser beam LB, the temperature of magneto-optical recording medium 15 is maximized at a position L1 behind the optical axis LBO of laser beam LB. Therefore, the temperature profile of magneto-optical recording medium 15 comes to be steeper at the side of the traveling direction DR of laser beam LB than position L1, and the temperature profile of magneto-optical recording medium 15 comes to be broader at the side opposite to the traveling direction DR of laser beam LB than position L1.

Under such a temperature distribution profile, mask 151 is changed from a perpendicular magnetization film to an in-plane magnetization film at a temperature T2 or higher, and mask 150 is changed from an in-plane magnetization film to a perpendicular magnetization film at a temperature T1 (lower than the temperature T2) or higher. Thus, magnetic domain 158 which has a perpendicular magnetization exchange coupled with a magnetic domain 75 of recording layer 7 exists in the region in mask layer 151 having a temperature lower than the temperature T1, and magnetic domain 157 which has an in-plane magnetization exists in the region having a higher temperature than the temperature T2. Further, of mask layer 150, magnetic domain 154 having an in-plane magnetization exists in a region having a lower temperature than the temperature T1, and a perpendicular magnetization is held in a region having a higher temperature than the temperature T2.

As a result, the copy of a magnetic domain 74 existing in a region of recording layer 7 having a temperature higher than the temperature T2 into reproducing layer 3 is interrupted by magnetic domain 157 having an in-plane magnetization of mask layer 151. Further, magnetic domain 75 existing in a region of a recording layer having a temperature lower than the temperature T1 is copied as magnetic domain 158 to mask layer 151. However, its copy to reproducing layer 3 is interrupted by magnetic domain 154 in mask layer 150 having an in-plane magnetization.

Thus, magnetic domain 70 in recording layer 7, having magnetization 71 within the range between the temperatures T1 and T2, is copied to mask layer 151 by exchange coupling as a magnetic domain 155 having magnetization 156 in the same direction as magnetization 71. In mask layer 150, it becomes a perpendicular magnetization film at a temperature of T1 or higher, so that magnetic domain 155 of mask layer 151 is copied to mask layer 150 by exchange coupling as a magnetic domain 152 having magnetization 153 in the same direction as magnetization 71. Magnetic domain 152 of mask layer 150 is further copied to magnetic field reinforcement layer 5 by exchange coupling as magnetic domain 50 having magnetization 51 in the same direction as magnetization 153, and a strong leakage magnetic field reaches from magnetic domain 50 of magnetic field reinforcement layer 5 to reproducing layer 3 via blocking layer 4. As a result, magnetic domain 50 of magnetic field reinforcement layer 5 is reliably copied to reproducing layer 3 as magnetic domain 30 via blocking layer 4.

The range of the temperature T1 at which mask layer 150 is changed from an in-plane magnetization film to a perpendicular magnetization film is herein set to 100–160° C., and the range of the temperature T2 at which mask layer 151 is changed from a perpendicular magnetization film to an in-plane magnetization film is set to 120–180° C. The difference between the temperatures T1 and T2 is suitably be in the range of 20–40° C., and by setting the difference T2 minus T1 to be in a range of 20–40° C., each magnetic domain of recording layer 7 can independently be copied to reproducing layer 3.

By controlling the intensity of laser beam LB and the rotation number of magneto-optical recording medium 15, the region of recording layer 7 in which the temperature attains from T1 to T2 can be as small as the minimum domain length, so that in magneto-optical recording medium 15, each magnetic domain of recording layer 7 can independently and reliably be copied to reproducing layer 3. As a result, a signal reproduction with a high resolution will be possible.

Seventh Embodiment

Figure 26:
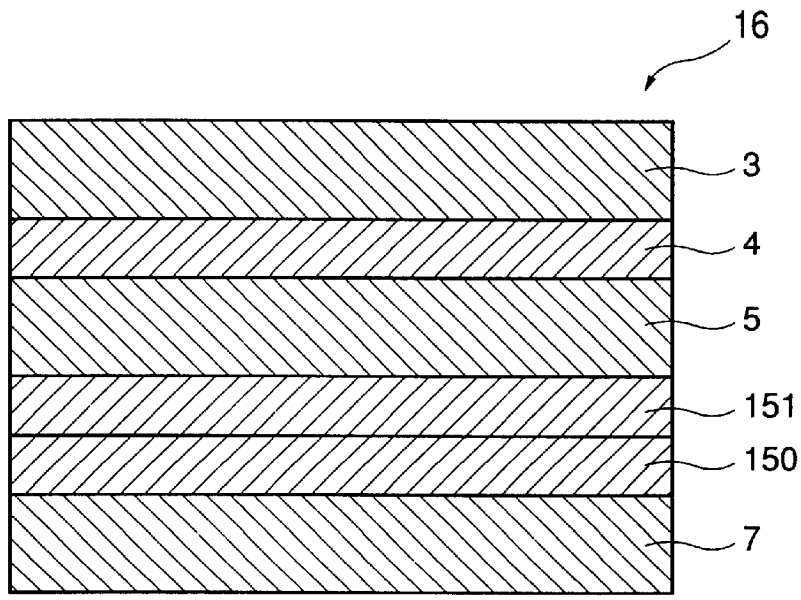
FIG. 26 is a sectional view illustrating a structure of the magneto-optical recording medium according to the seventh embodiment of the invention.

Referring to FIG. 26, in a magneto-optical recording medium 16 according to the seventh embodiment of the invention, mask layers 150 and 151 in the above-described sixth embodiment are formed in reversed order.

Eighth Embodiment

Figure 27:
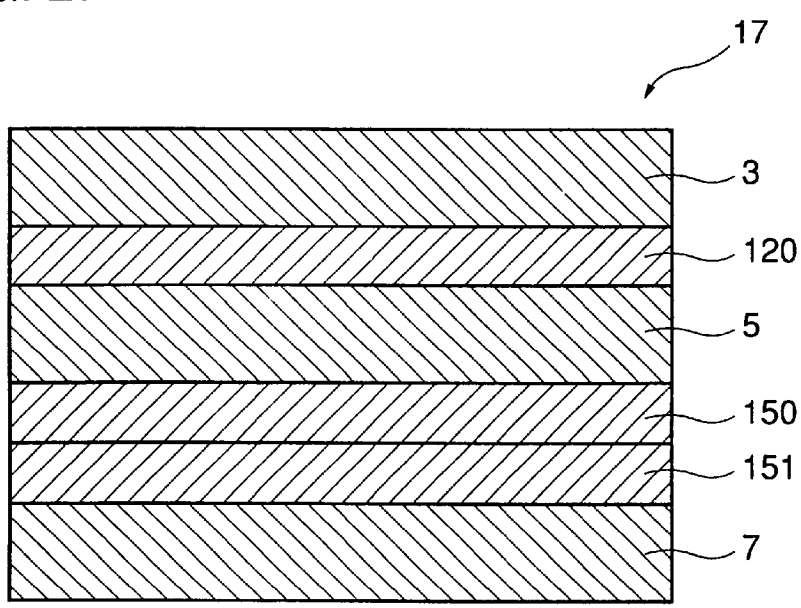
FIG. 27 is a sectional view illustrating a structure of the magneto-optical recording medium according to the eighth embodiment of the invention.

Referring to FIG. 27, in a magneto-optical recording medium 17 according to the eighth embodiment of the invention, a blocking layer 120 in the above-described third embodiment is formed in place of blocking layer 4 in the above-described sixth embodiment.

Ninth Embodiment

Figure 28:
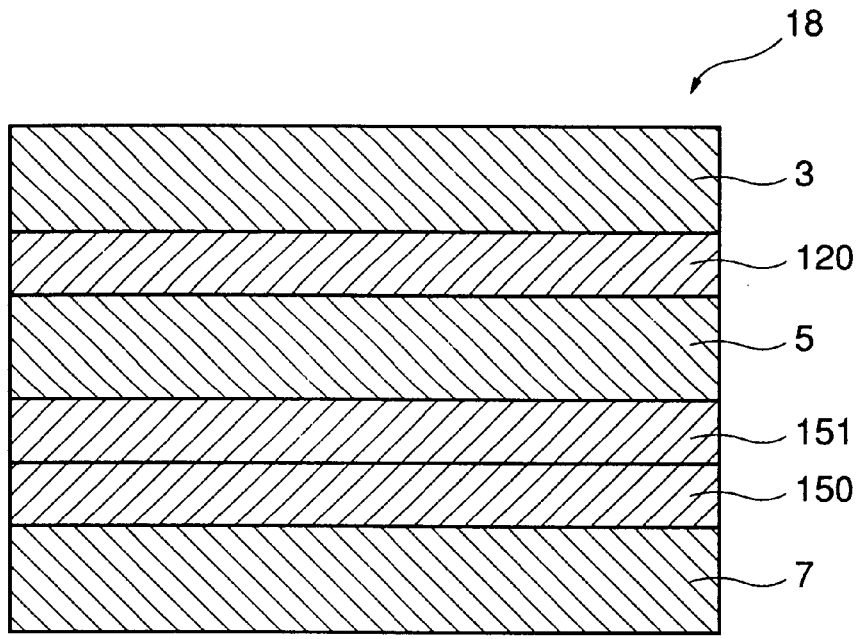
FIG. 28 is a sectional view illustrating a structure of the magneto-optical recording medium according to the ninth embodiment of the invention.

Referring to FIG. 28, in a magneto-optical recording medium 18 according to the ninth embodiment of the invention, mask layers 150 and 151 in the above-described eighth embodiment are formed in reversed order.

Tenth Embodiment

Figure 29:
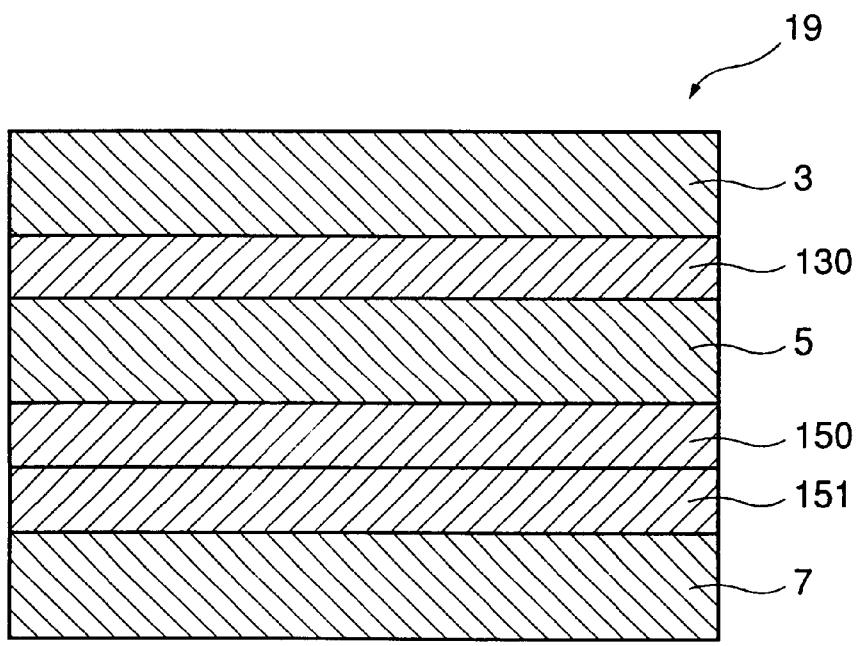
FIG. 29 is a sectional view illustrating a structure of the magneto-optical recording medium according to the tenth embodiment of the invention.

Referring to FIG. 29, in a magneto-optical recording medium 19 according to the tenth embodiment of the invention, a blocking layer 130 in the above-described fourth embodiment is formed in place of blocking layer 4 in the above-described sixth embodiment.

Eleventh Embodiment

Figure 30:
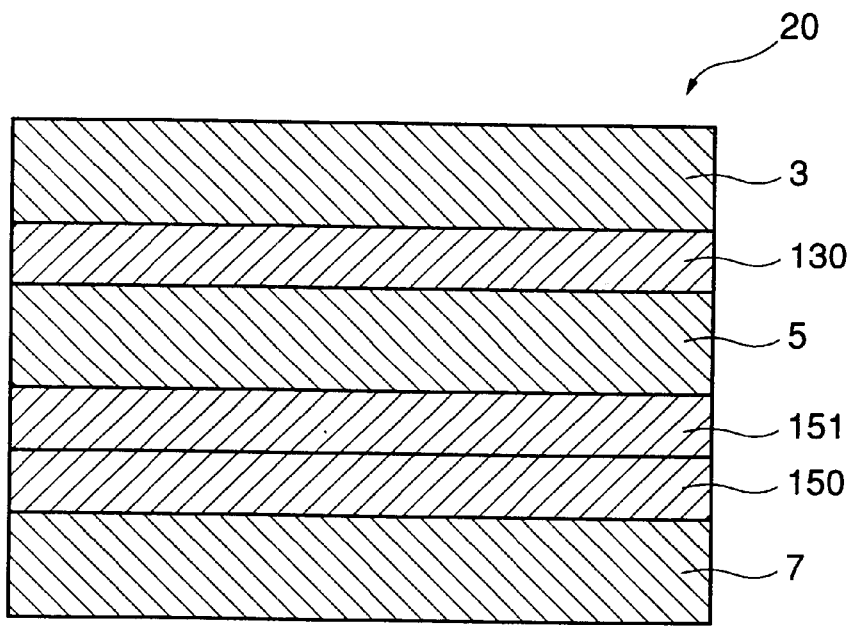
FIG. 30 is a sectional view illustrating a structure of the magneto-optical recording medium according to the eleventh embodiment of the invention.

Referring to FIG. 30, in a magneto-optical recording medium 20 according to the eleventh embodiment of the invention, mask layers 150 and 151 in the above-described tenth embodiment are formed in reversed order.

Twelfth Embodiment

Figure 31:
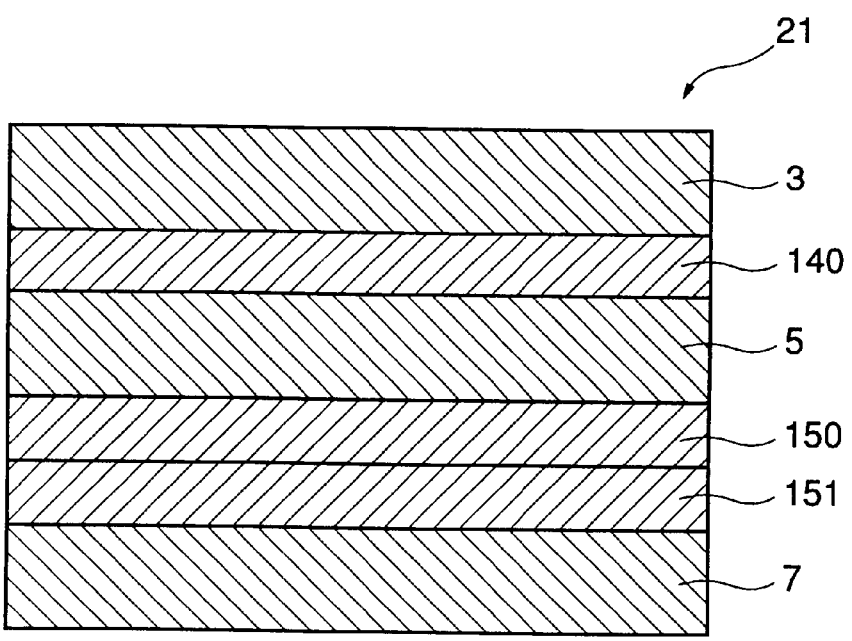
FIG. 31 is a sectional view illustrating a structure of the magneto-optical recording medium according to the twelfth embodiment of the invention.

Referring to FIG. 31, in a magneto-optical recording medium 21 according to the twelfth embodiment of the invention, a blocking layer 150 in the above-described fifth embodiment is formed in place of blocking layer 4 in the above-described sixth embodiment.

Thirteenth Embodiment

Figure 32:
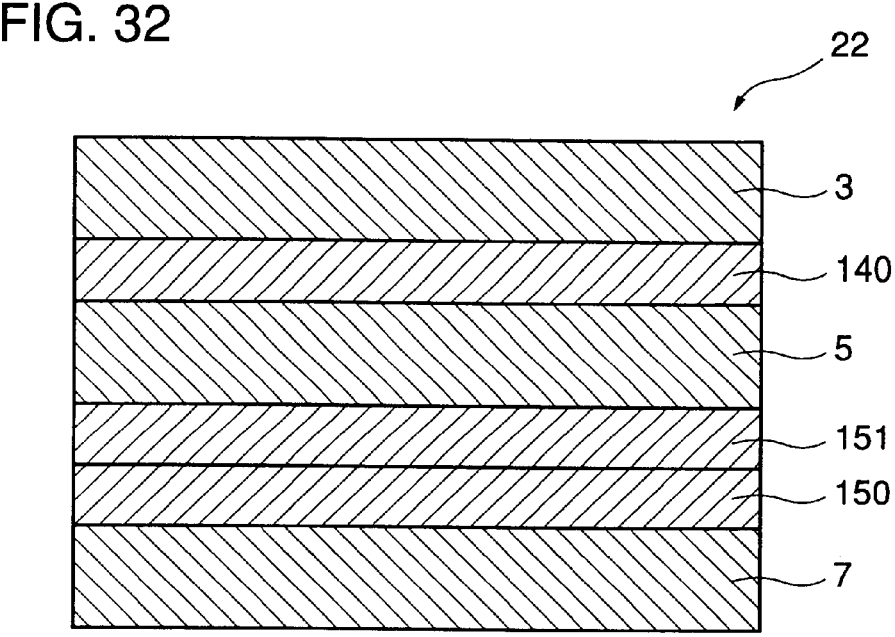
FIG. 32 is a sectional view illustrating a structure of the magneto-optical recording medium according to the thirteenth embodiment of the invention.

Referring to FIG. 32, in a magneto-optical recording medium 22 according to the thirteenth embodiment of the invention, mask layers 150 and 151 in the above-described twelfth embodiment are formed in reversed order.

Fourteenth Embodiment

Figure 33:
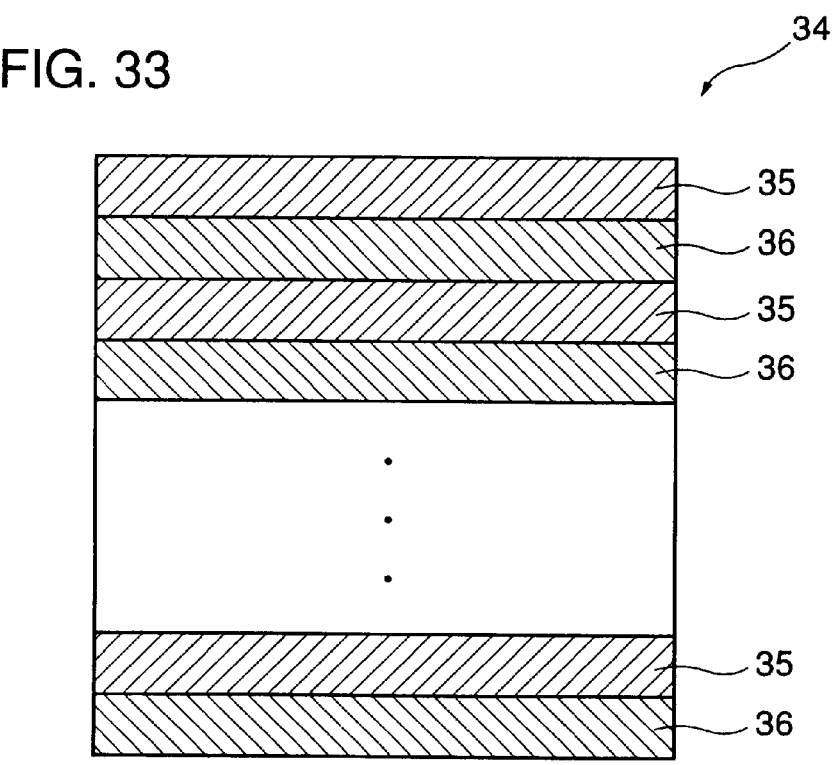
FIG. 33 is a sectional view illustrating a structure of the magneto-optical recording medium according to the fourteenth embodiment of the invention.

A reproducing layer 34 having a stacked structure may be formed as shown in FIG. 33 in place of reproducing layer 3 with a single-layered structure. In this reproducing layer 34, layers 35 made of noble metal and layers 36 made of transition metal are alternately formed. Pt, Pd, Cu or Au, for example, is used as the noble metal and Co, Fe or FeCo alloy is used as the transition metal.

Reproducing layer 3 may also be made of an alloy of noble metal and transition metal. For example, PtCo, PdCo, CuCo, AuCo, PtFe, PdFe, CuFe, AuFe, PtFeCo, Pd FeCo, CuFeCo or AuFeCo is used as the alloy of noble metal and transition metal.

Further, Nd or Pr can be added to reproducing layer 3 made of GdFeCo. In other words, reproducing layer can be made of NdGeFeCo or PrGdFeCo.

If the reproducing layer is formed of the above-described material, Kerr rotation angle with respect to a laser beam having relatively short wave length such as 400 nm will be greater than Kerr rotation angle of reproducing layer 3 formed of GdFeCo.

It should be appreciated that the embodiments disclosed herein are described by way of example and are not limited thereto in all aspects. The scope of the present invention is defined not by the above description but by the following claims, and is intended to cover all modifications fallen within the equivalent meaning and scope of the claims.

A magneto-optical recording medium according to the present invention can be utilized in an optical disk such as a CD (Compact Disk), a CD-ROM (Compact Disk-Read Only Memory), and a DVD (Digital Video Disc).

What is claimed is:

1. A magneto-optical recording medium which is irradiated with a laser beam and exposed to an external magnetic field, comprising:
   a reproducing layer,
   a blocking layer formed on said reproducing layer,
   a gate/magnetic field reinforcement layer formed on said blocking layer, and
   a recording layer formed on said gate/magnetic field reinforcement layer and having a plurality of magnetic domains,
   wherein a saturation magnetization of said gate/magnetic field reinforcement layer at an interface in contact with said blocking layer is greater than a saturation magnetization of said gate/magnetic field reinforcement layer at an interface in contact with said recording layer at a reproducing temperature such that said gate/magnetic field reinforcement layer selectively extracts each magnetic domain within said recording layer and reinforces a leakage magnetic field reaching therefrom to said reproducing layer to copy the extracted magnetic domain to said reproducing layer, and
   wherein said blocking layer blocks an exchange coupling force from said gate/magnetic field reinforcement layer to said reproducing layer, and has perpendicular magnetization at room temperature and an in-plane magnetization at a temperature lower than the maximum temperature of said magneto-optical recording medium irradiated with said laser beam.

2. The magneto-optical recording medium according to claim 1, wherein said gate/magnetic field reinforcement layer has a saturation magnetization increasing from said recording layer side toward said blocking layer side at a reproducing temperature.

3. The magneto-optical recording medium according to claim 2, wherein said gate/magnetic field reinforcement layer contains a rare earth metal, the percentage content of which decreases from said recording layer side toward said blocking layer side.

4. The magneto-optical recording medium according to claim 1, wherein said gate/magnetic field reinforcement layer includes:
   a gate layer selectively extracting each said magnetic domain, said gate layer consisting of a magnetic material in which each said magnetic domain in said recording layer may be copied at a temperature of about 100° C., and
   a magnetic field reinforcement layer formed between said blocking layer and said gate layer to reinforce said leakage magnetic field,
   wherein said gate layer has an in-plane magnetization at room temperature which changes to perpendicular magnetization at a reproducing temperature in order to change from in-plane to perpendicular magnetization in a region smaller than the minimum magnetic domain of the recording layer.

5. The magneto-optical recording layer according to claim 4, wherein said gate layer includes
   a first mask layer (150) having an in-plane magnetization at room temperature and a perpendicular magnetization at said reproducing temperature or higher, and
   a second mask layer (151) having a perpendicular magnetization at room temperature and an in-plane magnetization at said reproducing temperature or higher,
   wherein neither first nor second mask layer has a saturation magnetization greater than the saturation magnetization of the magnetic field reinforcement layer.

6. The magneto-optical recording medium according to claim 4, wherein said magnetic field reinforcement layer has a saturation magnetization greater than the saturation magnetization of said layer at said reproducing temperature.

7. The magneto-optical recording medium according to claim 6, wherein said gate layer has an in-plane magnetization at room temperature and a perpendicular magnetization at said reproducing temperature or higher, and
   wherein the saturation magnetization of said magnetic reinforcement layer is maximized at a temperature higher than said reproducing temperature.

8. The magneto-optical recording medium according to claim 7, wherein said gate layer essentially consists of GdFeCo containing 22 to 33 at. % of Gd, and wherein
   said magnetic field reinforcement layer essentially consists of GdFeCo containing 16 to 23 at. % of Gd.

9. A magneto-optical recording medium which is irradiated with a laser beam and exposed to an external magnetic field, comprising:
   a reproducing layer;
   a blocking layer formed on said reproducing layer;
   a gate/magnetic field reinforcement layer formed on said blocking layer; and
   a recording layer formed on said gate/magnetic field reinforcement layer,
   wherein a saturation magnetization of said gate/magnetic field reinforcement layer at an interface in contact with said blocking layer is greater than a saturation magnetization of said gate/magnetic field reinforcement layer at an interface in contact with said recording layer at a reproducing temperature such that said gate/magnetic field reinforcement layer selectively extracts each magnetic domain within said recording layer and reinforces a leakage magnetic field reaching therefrom to said reproducing layer to copy the extracted magnetic domain to said reproducing layer, and wherein said blocking layer blocks an exchange coupling force from said gate/magnetic field reinforcement layer to said reproducing layer, said blocking layer consisting essentially of a non-magnetic material.

10. The magneto-optical recording medium according to claim 9, wherein said gate/magnetic field reinforcement layer has a saturation magnetization increasing from said recording layer side toward said blocking layer side at a reproducing temperature.

11. The magneto-optical recording medium according to claim 10, wherein said gate/magnetic field reinforcement layer contains a rare earth metal, the percentage content of which decreases from said recording layer side toward said blocking layer side.

12. The magneto-optical recording medium according to claim 9, wherein said gate/magnetic field reinforcement layer includes:

a gate layer selectively extracting each said magnetic domain, said gate layer consisting of a magnetic material in which each said magnetic domain in said recording layer may be copied at a temperature of about 100° C.; and a magnetic field reinforcement layer formed between said blocking layer and said gate layer to reinforce said leakage magnetic field, wherein said gate layer has an in-plane magnetization at room temperature which changes to perpendicular magnetization at a reproducing temperature in order to change from in-plane to perpendicular magnetization in a region smaller than the minimum magnetic domain of the recording layer.

13. The magneto-optical recording medium according to claim 12, wherein said magnetic field reinforcement layer has a saturation magnetization greater than a saturation magnetization of said gate layer at a reproducing temperature.

14. The magneto-optical recording medium according to claim 13, wherein said gate layer has an in-plane magnetization at room temperature and a perpendicular magnetization at said reproducing temperature or higher, and wherein the saturation magnetization of said magnetic reinforcement layer is maximized at a temperature higher than said reproducing temperature.

15. The magneto-optical recording medium according to claim 14, wherein said gate layer essentially consists of GdFeCo containing 22 to 33% of Gd, said magnetic field reinforcement layer consisting essentially of GdFeCo containing 16 to 23% of Gd.

* * * * *